US009360966B2

(12) United States Patent
Holmgren et al.

(10) Patent No.: US 9,360,966 B2
(45) Date of Patent: Jun. 7, 2016

(54) METHOD FOR GENERALLY CONTINUOUSLY CALIBRATING AN INTERACTIVE INPUT SYSTEM

(71) Applicant: SMART Technologies ULC, Calgary (CA)

(72) Inventors: David Holmgren, Calgary (CA); Daniel McReynolds, Calgary (CA); Grant McGibney, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 387 days.

(21) Appl. No.: 13/834,358

(22) Filed: Mar. 15, 2013

(65) Prior Publication Data

US 2013/0257822 A1    Oct. 3, 2013

Related U.S. Application Data

(60) Provisional application No. 61/618,667, filed on Mar. 30, 2012.

(51) Int. Cl.
 *G06F 3/042* (2006.01)
 *G06F 3/041* (2006.01)

(52) U.S. Cl.
 CPC ............ *G06F 3/0418* (2013.01); *G06F 3/0428* (2013.01)

(58) Field of Classification Search
 None
 See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,372,456 B2 | 5/2008 | McLintock | |
| 7,432,917 B2 | 10/2008 | Wilson et al. | |
| 7,532,206 B2 | 5/2009 | Morrison et al. | |
| 8,004,503 B2 | 8/2011 | Zotov et al. | |
| 2009/0146972 A1 | 6/2009 | Morrison et al. | |

(Continued)

FOREIGN PATENT DOCUMENTS

WO   2011085486 A1   7/2011

OTHER PUBLICATIONS

W.H. Jefferys, "On the method of least-squares", Astronomical Journal, vol. 85, No. 2, (1980): 177-181.
W.H. Jefferys, "On the method of least-squares II", Astronomical Journal, vol. 86, No. 1, (1981): 149-155.
Astrom, Kalle and Oskarsson, Magnus, "Solutions and Ambiguities of the Structure and Motion Problem for 1D Retinal Vision," Journal of Mathenzatical Imaging and Vision, vol. 12, (1999): 121-135.

(Continued)

*Primary Examiner* — Adam R Giesy
(74) *Attorney, Agent, or Firm* — Perkins Coie LLP

(57) ABSTRACT

A method for generally continuously calibrating an interactive input system, the interactive input system comprising at least two imaging devices having fields of view encompassing a region of interest, at least one of the imaging devices calibrated using a projection matrix having an associated quality metric, the method comprises estimating new values for parameters of the projection matrix based on a plurality of computed locations of at least one pointer brought into proximity with the region of interest; calculating a new quality metric using the new parameter values; and if the new quality metric is more accurate than the existing quality metric, updating the projection matrix using the new parameter values.

49 Claims, 17 Drawing Sheets

(56) References Cited

U.S. PATENT DOCUMENTS

2011/0050640 A1*  3/2011  Lundback .............. G06F 3/041
                                                    345/175
2012/0194479 A1*  8/2012  Stark .................... G06F 3/0428
                                                    345/175

OTHER PUBLICATIONS

Transmittal; International Search Report; and the Written Opinion of the International Searching Authority for International Application No. PCT/CA2013/000229 with a mailing date of Jun. 25, 2013.

* cited by examiner

METHOD FOR GENERALLY CONTINUOUSLY CALIBRATING AN INTERACTIVE INPUT SYSTEM

CROSS-REFERENCE TO RELATED APPLICATION

This application claims the benefit of U.S. Provisional Application No. 61/618,667 to Holmgren et al. filed on Mar. 30, 2012, the entire disclosure of which is incorporated herein by reference.

FIELD OF THE INVENTION

The present invention relates to a method for generally continuously calibrating an interactive input system and to an interactive input system employing the method.

BACKGROUND OF THE INVENTION

Interactive input systems that allow users to inject input (e.g., digital ink, mouse events, etc.) into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the disclosures of which are incorporated by reference in their entirety; touch systems comprising touch panels employing electromagnetic, capacitive, acoustic or other technologies to register pointer input; tablet and laptop personal computers (PCs); smartphones, personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Above-incorporated U.S. Pat. No. 5,448,263 to Martin discloses a passive touch system including a touch screen coupled to a computer. The computer display is projected on to the touch surface of the touch screen via an imaging device such as a projector. The coordinates representing specific locations on the touch surface are mapped to the coordinate system of the computer display. When a user contacts the touch surface of the touch screen, coordinate data is generated by the touch screen and fed to the computer. The computer maps the received coordinate data to the computer display thereby allowing the user to operate the computer in a manner similar to using a computer mouse simply by contacting the touch surface. Furthermore, the coordinate data fed back to the computer can be recorded in an application and redisplayed at a later time. Recording the coordinate data generated in response to user contacts is typically done when it is desired to record information written or drawn on the touch surface by the user.

As the projector is separate from the touch surface of the touch screen, steps must be taken to calibrate the touch system thereby to align the projected image of the computer display with the coordinate system of the touch screen. During calibration, calibration marks are projected on to the touch surface and the user is prompted to contact the touch surface at the calibration mark locations resulting in coordinate data being generated. Since the coordinates of the calibration marks in the computer display coordinate system are known, the coordinate data generated by the touch screen in response to the user contacts at the calibration mark locations can be used to map the coordinate system of the touch screen to the computer display coordinate system. This calibration process corrects for projector/touch surface misalignment, and compensates for scale, skew, rotation and keystone distortion.

U.S. Pat. No. 7,372,456 to McLintock and assigned to SMART Technologies ULC, the disclosure of which is incorporated by reference in its entirety, discloses a method of calibrating an interactive touch system that includes moving or tracing a pointer along at least one path on a touch surface over a calibration image presented on the touch surface. Pointer coordinates are generated generally continuously during the tracing and represent pointer contact locations on the touch surface. The coordinate system of the touch surface is mapped to the coordinate system of the calibration image using the pointer coordinates and the calibration image.

As will be appreciated, after an interactive input system has been calibrated, events may occur that reduce the accuracy of the calibration. For example, in the case of machine vision interactive input systems such as that disclosed in above-incorporated U.S. Pat. No. 6,803,906 to Morrison et al., the positions and orientations of the digital cameras may shift over time, due to thermal changes, mechanical flexure and other environmental factors. These digital camera positional and orientation shifts may in turn introduce errors in the transformation of touch points from digital camera coordinates to display coordinates. Accordingly, improvements in interactive input system calibration are desired.

It is therefore an object to provide a novel method for generally continuously calibrating an interactive input system, and a novel an interactive input system employing the method.

SUMMARY OF THE INVENTION

Accordingly, in one aspect there is provided a method for generally continuously calibrating an interactive input system, the interactive input system comprising at least two imaging devices having fields of view encompassing a region of interest, at least one of said imaging devices calibrated using a projection matrix having an associated quality metric, the method comprising estimating new values for parameters of the projection matrix based on a plurality of computed locations of at least one pointer brought into proximity with the region of interest; calculating a new quality metric using the new parameter values; and if the new quality metric is more accurate than the existing quality metric, updating the projection matrix using the new parameter values.

In one embodiment, the method further comprises generally continuously storing computed locations generated in response to each pointer brought into proximity with the region of interest and only performing the estimating when at least one condition is satisfied. The at least one condition may be satisfied when the number of stored computed locations is greater than a threshold. The at least one condition may be satisfied when a threshold number of computed locations generally over the entire region of interest have been stored. In this latter case, the region of interest may be subdivided into a plurality of bins. During the storing, each computed location is stored in a respective bin, with the at least one condition being satisfied when the total number of bins having a threshold number of computed locations therein is greater than the threshold. Alternatively, during the storing, each computed location is stored in a respective bin with the at least one condition being satisfied when the percentage of non-empty bins is greater than the threshold.

In one embodiment, the quality metric is an overlap metric. The method may further comprise determining an area of a polygon formed by the intersection of observed lines of sight of the at least one pointer as identified by each of the at least two imaging devices and determining a ratio of the area to a maximum theoretical area to calculate the overlap metric. In another embodiment, the quality metric is concurrency-based metric. In this case, the method may further comprise determining a direct line of sight of each of the at least two imaging devices to the at least one pointer and calculating an orthogonal distance from each of the direct lines of sight of each of the two imaging devices to a computed location of the at least one pointer and computing a cost function based on the orthogonal distances to calculate the overlap metric.

In one embodiment, each computed location is stored only if the computed location satisfies at least one qualification criteria. The at least one qualification criteria may require the computed location to correspond to a single pointer brought into proximity with the region of interest, the computed location to be within the fields of view of the at least two imaging devices, the width of the at least one pointer associated with the computed location to be below a width threshold and/or the velocity of the at least one pointer associated with the computed location to be below a velocity threshold.

According to another aspect there is provided a method of calibrating an interactive input system comprising during normal operation of said interactive input system, storing touch point data generated in response to pointer interaction with an interactive surface; and calibrating the interactive input system using the stored touch point data.

According to another aspect there is provided an interactive input system comprising an interactive board configured to generate output in response to pointer interaction therewith; and a processor device communicating with the interactive board, said processor device, during operation of said interactive input system, storing touch point data generated in response to pointer interaction with said interactive board and calibrating the interactive input system using the stored touch point data.

BRIEF DESCRIPTION OF THE DRAWINGS

Embodiments will now be described more fully with reference to the accompanying drawings in which.

DETAILED DESCRIPTION OF THE EMBODIMENTS

In the following, systems and methods for carrying out calibration procedures that are intended to mitigate loss of calibration in interactive input systems employing machine vision are described. The calibration procedures are sometimes referred to as continuous calibration or self-calibration procedures and involve a substantially continuous collection of touch data, at least some of which is used in periodic calibration calculations.

Figure 1:
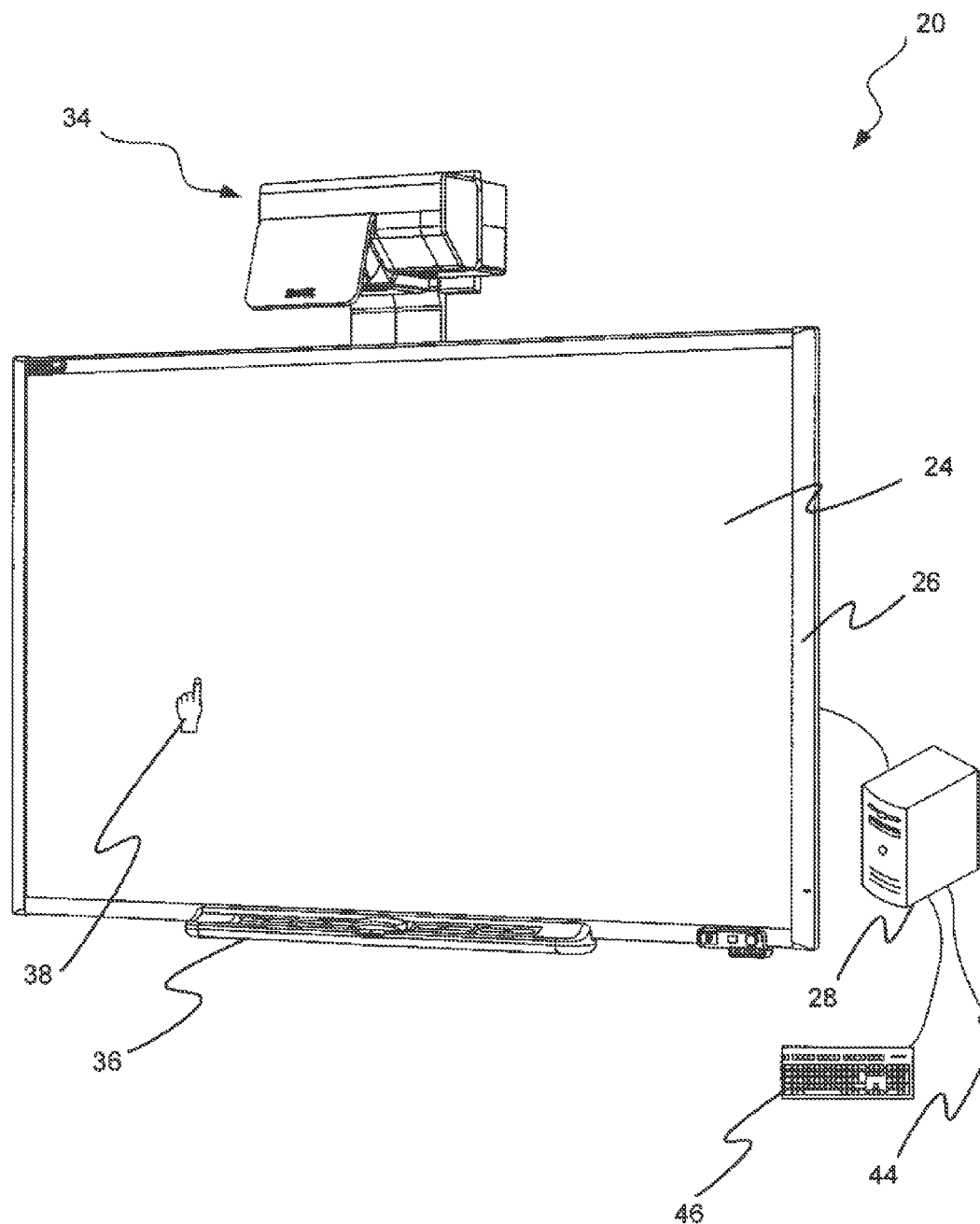
FIG. 1 is a perspective view of an interactive input system.

FIG. 1 depicts an exemplary interactive input system generally identified by reference numeral 20. Interactive input system 20 allows one or more users to inject input such as digital ink, mouse events, commands, etc. into an executing application program. In this embodiment, interactive input system 20 comprises a two-dimensional (2D) interactive device in the form of an interactive whiteboard (IWB) 22 mounted on a vertical support surface such as for example, a wall surface or the like or otherwise supported or suspended in an upright orientation. IWB 22 comprises a generally planar, rectangular interactive surface 24 that is surrounded about its periphery by a bezel 26. An ultra-short-throw projector 34, such as that sold by SMART Technologies ULC under the name "SMART UX60", is also mounted on the support surface above the IWB 22 and projects an image, such as for example, a computer desktop, onto the interactive surface 24.

The IWB 22 employs machine vision to detect one or more pointers brought into a region of interest in proximity with the interactive surface 24. The IWB 22 communicates with a general purpose computing device 28 executing one or more application programs via a universal serial bus (USB) cable or other suitable wired or wireless communication link. General purpose computing device 28 processes the output of the IWB 22 and adjusts image data that is output to the projector 34, if required, so that the image presented on the interactive surface 24 reflects pointer activity. In this manner, the IWB 22, general purpose computing device 28 and projector 34 allow pointer activity proximate to the interactive surface 24 to be recorded as writing or drawing or used to control execution of one or more application programs executed by the general purpose computing device 28.

The bezel 26 is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 24.

A tool tray 36 is affixed to the IWB 22 adjacent the bottom bezel segment using suitable fasteners such as for example, screws, clips, adhesive etc. As can be seen, the tool tray 36 comprises a housing having an upper surface configured to define a plurality of receptacles or slots. The receptacles are sized to receive one or more pen tools as well as an eraser tool that can be used to interact with the interactive surface 24. Control buttons are also provided on the upper surface of the tool tray housing to enable a user to control operation of the interactive input system 20. Further specifies of the tool tray 36 are described in International PCT Publication Application No. WO 2011/085486 filed on Jan. 13, 2011, and entitled "INTERACTIVE INPUT SYSTEM AND TOOL TRAY THEREFOR".

Imaging devices 50A to 50D (see FIG. 2) are accommodated by the bezel 26, with each imaging device being positioned adjacent a different corner of the bezel. Each of the imaging devices includes an image sensor and associated lens assembly that provides the image sensor with a field of view (FOV) sufficiently large as to encompass the entire interactive surface 24. A digital signal processor (DSP) or other suitable processing device associated with each image sensor sends clock signals to the image sensor causing the image sensor to capture image frames at the desired frame rate. During image frame capture, the DSP also causes an infrared (IR) light source or other suitable illumination source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes IR illumination and appears as a dark region interrupting the bright band in captured image frames.

The imaging devices 50A to 50D are oriented so that their fields of view overlap and look generally across the entire interactive surface 24. In this manner, any pointer 38 such as for example a user's finger, a cylinder or other suitable object, a pen tool or an eraser tool lifted from a receptacle of the tool tray 36, that is brought into proximity of the interactive surface 24 appears in the fields of view of the imaging devices and thus, is captured in image frames acquired by multiple imaging devices. When the imaging devices 50A to 50D acquire image frames in which a pointer exists, the imaging devices convey pointer data to the general purpose computing device 28. With one imaging device installed at each corner of the interactive surface 24, the IWB 22 is able to detect multiple simultaneous pointer contacts on the interactive surface 24.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The general purpose computing device 28 may also comprise networking capabilities using Ethernet, WiFi, and/or other suitable network format, to enable connection to shared or remote drives, one or more networked computers, or other networked devices. A mouse 44 and a keyboard 46 are coupled to the general purpose computing device 28.

The general purpose computing device 28 processes pointer data received from the imaging devices 50A to 50D to resolve pointer ambiguity by combining the pointer data generated by the imaging devices, and to compute the locations of pointers proximate to the interactive surface 24 using well known triangulation. The computed pointer locations are then recorded by the general purpose computing device 28 as writing or drawing or used as an input command to control execution of an application program as described above.

In addition to computing the locations of pointers proximate to the interactive surface 24, the general purpose computing device 28 also determines the pointer types (e.g., pen tool, finger or palm) by using pointer type data received from the IWB 22. In this embodiment, the pointer type data is generated for each pointer contact by the DSP of at least one of the imaging devices by differentiating a curve of growth derived from a horizontal intensity profile of pixels corresponding to each pointer tip in captured image frames. Specifics of methods used to determine pointer type are disclosed in above-incorporated U.S. Pat. No. 7,532,206 to Morrison et al.

Figure 2:
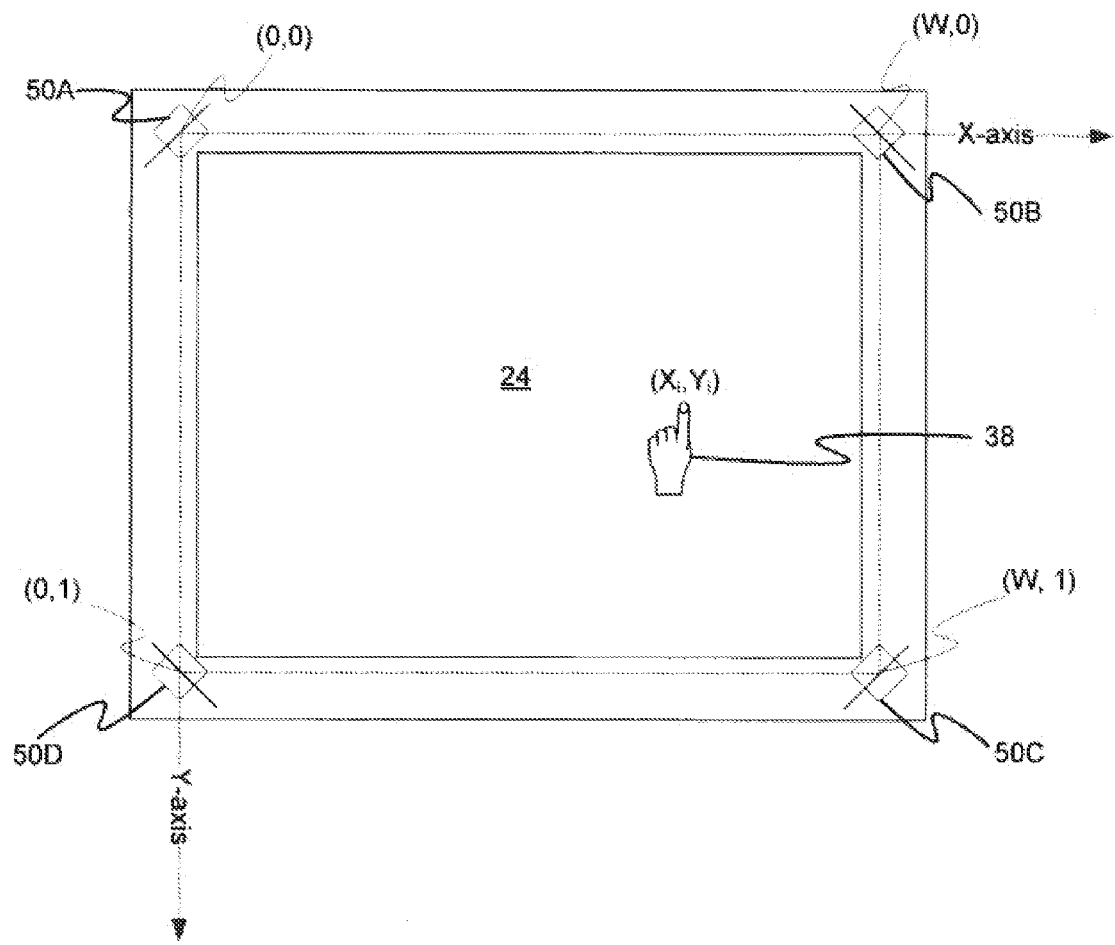
FIG. 2 is a schematic front view of a portion of a two-dimensional interactive device forming part of the interactive input system of FIG. 1.

FIG. 2 illustrates a schematic front view of a portion of the interactive device 22. As can be seen and as described above, the imaging devices 50A, 50B, 50C and 50D are positioned adjacent the four (4) corners of the bezel 26. A reference Cartesian coordinate system for the interactive surface 24 is defined as follows. The origin (0, 0) of the reference Cartesian coordinate system is set as the focal point of imaging device 50A. The X-axis of the reference Cartesian coordinate system is defined as extending in the horizontal direction with reference to the orientation of the interactive surface 24. The Y-axis of the reference Cartesian coordinate system is defined as extending in the vertical direction with reference to the orientation of the interactive surface 24.

As shown, the interactive surface 24 has a width having an X-value denoted by reference character "W", and a normalized height defined as having a Y-value of "1". Using this defined reference Cartesian coordinate system, the coordinates of the focal point of each of the four imaging devices 50A to 50D is shown in Table 1 below.

TABLE 1

Coordinates of the Focal Point of each Imaging Device

| Imaging Device | Coordinates |
|---|---|
| 50A | (0, 0) |
| 50B | (W, 0) |
| 50C | (W, 1) |
| 50D | (0, 1) |

As will be appreciated, calibration of the interactive input system 20 is required to establish a relationship between a position on the interactive surface 24 and a corresponding position on the image sensor of the each imaging device 50A to 50D. Once the interactive input system 20 has been calibrated, the location of any pointer 38 such as for example a finger, a pen tool, etc. brought into proximity with the interactive surface 24 can be accurately calculated.

The mapping of a touch point made by a pointer at a position $(X_i, Y_i)$ on the interactive surface 24 to a column position $x_i$ on the image sensor of a given imaging device, such as for example imaging device 50A, can be written in matrix form, shown below as Equation (1):

$$\gamma \begin{bmatrix} x_i \\ 1 \end{bmatrix} = \begin{bmatrix} P_{11} & P_{12} & P_{13} \\ P_{21} & P_{22} & P_{23} \end{bmatrix} \begin{bmatrix} X_i \\ Y_i \\ 1 \end{bmatrix} \quad (1)$$

where elements $P_{ij}$ (for $1 \le i \le 2$, $1 \le j \le 3$) of a projection matrix P encapsulate the imaging device focal length, orientation angle, principal point and position, and $\gamma$ is the projective depth for position $(X_i, Y_i)$. The column position $x_i$ on the image sensor of the imaging device 50A resulting from a pointer at position $(X_i, Y_i)$ on the interactive surface 24 can be computed from Equation (1) as:

$$x_i = \frac{P_{11}X_i + P_{12}Y_i + P_{13}}{P_{21}X_i + P_{22}Y_i + P_{23}} \quad (2)$$

The projection matrix P may be simplified as:

$$P = K \cdot R \cdot C' \quad (3)$$

where K is an internal imaging device matrix encapsulating a focal length $f$ and a principal point $x_0$, and is defined as:

$$K = \begin{bmatrix} f & x_0 \\ 0 & 1 \end{bmatrix} \quad (4)$$

R is a rotation matrix (corresponding to the orientation angle $\theta$ of the imaging device), defined as:

$$R = \begin{bmatrix} \cos\theta & -\sin\theta \\ \sin\theta & \cos\theta \end{bmatrix} \quad (5)$$

and C' is a matrix formed from the concatenation of a 2×2 identity matrix $I_2$ with imaging device position vector C (corresponding to the position of the imaging device with respect to the reference Cartesian coordinates of the interactive surface 24 defined in FIG. 2), and is defined as:

$$C' = [I_2' - C]. \quad (6)$$

An estimate of the projection matrix P for the imaging device allows the orientation angle $\theta$, focal length $f$ and principal point $x_0$ to be obtained from elements $P_{ij}$ of the projection matrix P according to:

$$\theta = -\tan^{-1}\frac{P_{22}}{P_{21}} \quad (7)$$

$$f = P_{21}P_{12} + P_{11}P_{12} \quad (8)$$

$$x_0 = P_{11}P_{21} + P_{12}P_{22} \quad (9)$$

As will be appreciated, calibration of the interactive input system 20 requires updating the parameters of projection matrix P that relate to the external orientation of each imaging device, that is, the position of each imaging device and the orientation angle of each imaging device. The parameters are updated using an estimation method, which will be further described below. An independent calibration method is used to obtain a model of the lens of each imaging device.

In the embodiment shown in FIG. 1, a given column position $x_i$ on the image sensor of a given imaging device can be written in angular form as:

$$\tan\alpha = (x_i - x_0)/f \quad (10)$$

where focal length $f \approx 1$ and principal point $x_0 \approx 0$.

Once interactive input system 20 has been initially calibrated using one or more available well known calibration techniques, over time the interactive input system 20 may go out of calibration as a result of changes, such as for example a change in imaging device position and/or orientation that may have occurred due to variations in the environment, thermal fluctuations, mechanical flexure, etc. In this embodiment, the interactive input system 20 stores touch point data computed during normal operation, and uses this touch point data to generally continuously calibrate the interactive input system 20.

As will be appreciated, the use of projection matrices for calibrating each of the imaging devices requires unbiased estimates for each projection matrix P. As such, it is reasonable to account for the fact that the column position $x_i$ of a pointer on the image sensor of a given imaging device may have errors which may be partially dependent on the distance from the imaging device to the location of the pointer $(X_i, Y_i)$ on the interactive surface 24. The estimation of the projection matrix P for each imaging device is performed using an errors-in-variables technique developed by W. H. Jefferys (hereinafter referred to as "Jefferys' method") which is described in the publication authored by W. H. Jefferys, entitled "On the method of least-squares", *Astronomical Journal, Vol.* 85, no. 2, (1980): 177-181, and in the publication authored by W. H. Jefferys, entitled "On the method of least-squares II", *Astronomical Journal, vol.* 86, no. 1, (1981): 149-155, the disclosures of which are incorporated herein by reference in their entirety.

Adapting Jefferys' method to calibrate interactive input system 20, the non-uniform errors in the touch point data are taken into account through an iterative re-weighting. Touch points are assigned weights according to an estimate of the noise in the data (i.e., is a given touch point above or below a noise threshold). This is computed by measuring noise in data, which is encapsulated in a data noise covariance matrix $\sigma \equiv \sigma_x I$, where I is an identity matrix and $\sigma_x$ is a scalar data error scale factor.

Generally, in the following embodiments an observation data set comprising measurements of the location of a pointer ($X_i$, $Y_i$) and the corresponding column position $x_i$ of the pointer on the image sensor of each imaging device needs to be obtained. A minimum number of touch point data is required to ensure that the least-squared estimation is well-conditioned. For example, a set of touch data comprising twenty-five (25) touch points leads to an estimation problem in which twenty-four (24) parameters (i.e., the six projection matrix P elements for each of the four (4) imaging devices) are determined by one-hundred (100) observations (25 touch data points×4 observations per touch point).

To obtain a consistent result, the projection matrices P for all imaging devices are estimated simultaneously using all of the touch point data. Constraints such as the orthogonality constraint shown below can be imposed on each projection matrix according to:

$$P_{21}^2 + P_{22}^2 - 1 = 0 \quad (11)$$

The orthogonality constraint places each projection matrix P onto a common scale. Once the projection matrices P have been estimated along with their errors, the orientation angle θ, focal length $f$ and principal point $x_0$ of each imaging device is calculated using Equations (7) to (9) above. The position of each imaging device ($X_c$, $Y_c$) is determined by computing the null space of its associated projection matrix P. Note that using the null space is both a formal definition as well as a practical method. However, in this case it is easy to find the imaging device position from $-P^{-1}_{(1:2,3)} \cdot P_{(1:2,3)}$, i.e., the negated inverse of the first 2×2 sub-matrix of matrix P multiplied by its last column.

As will be appreciated, setting the origin of the reference Cartesian coordinate system (shown in FIG. 2) such that imaging device 50A is positioned at the origin (0, 0), and normalizing the coordinate system such that imaging device 50D is positioned at (0, 1) results in the following the projection matrices for imaging devices 50A and 50D, respectively:

$$P_{50A} = \begin{bmatrix} P_{11} & P_{12} & 0 \\ P_{21} & P_{22} & 0 \end{bmatrix} \quad (12A)$$

$$P_{50D} = \begin{bmatrix} P_{11} & P_{12} & -P_{12} \\ P_{21} & P_{22} & -P_{22} \end{bmatrix} \quad (12B)$$

Since the coordinates of imaging devices 50A and 50D are known, four parameters are eliminated from the calibration solution.

Figure 3:
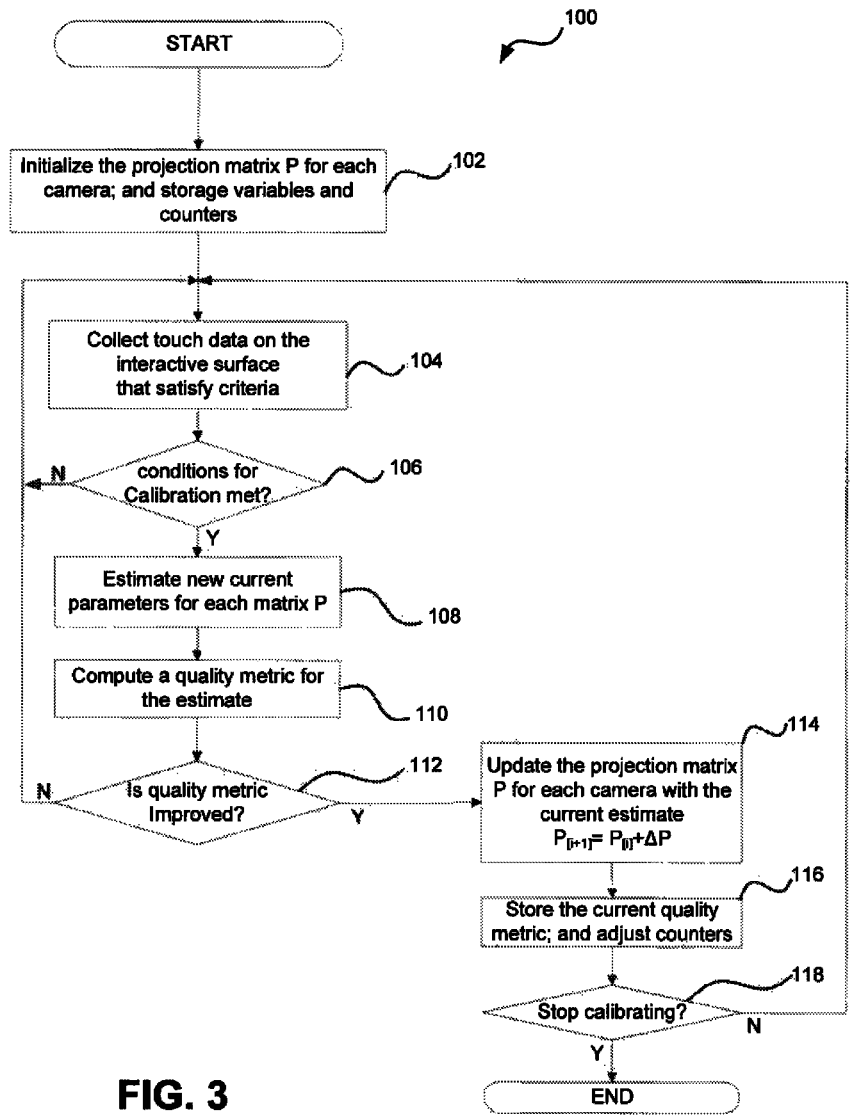
FIG. 3 is a flowchart steps of showing a method for generally continuously calibrating the interactive input system of FIG. 1.

Turning now to FIG. 3, a method for generally continuously calibrating an interactive input system is shown and is generally identified by reference numeral 100. The method begins when the interactive input system 20 is powered on, at which time the projection matrix P for each imaging device is obtained and all storage variables and counters are set to default values (step 102). During the method, while the interactive input system 20 is in normal operation, the general purpose computing device 28 of interactive input system 20 also collects touch point data associated with pointers brought into proximity with the interactive surface 24, and stores touch point data that satisfies a predetermined set of criteria for calibration purposes, as will be described below (step 104). All such touch point data that is stored is hereinafter referred to as a "set of touch data".

Each time a pointer is brought into proximity or into contact with the interactive surface 24 and the resulting touch point data is stored by the general purpose computing device 28, a check is performed by the general purpose computing device 28 to determine if the set of touch data satisfies one or more predefined conditions to initiate calibration of the interactive input system 20 (step 106). If the one or more predefined conditions to initiate calibration are not met, the general purpose computing device 28 reverts back to step 104 and continues to collect touch point data that satisfies the predetermined set of criteria. At step 106, if the set of touch data satisfies the one or more predefined conditions to initiate calibration, the general purpose computing device 28 estimates new parameters for the projection matrix P associated with each of the imaging devices 50A to 50D (step 108).

Once the new parameters for the projection matrix P associated with each of the imaging devices 50A to 50D have been estimated, a quality metric is calculated (step 110) using the new parameters. A check is then made by the general purpose computing device 28 to determine if the quality metric has been improved, that is, if the new parameters $P_{ij}$ are more accurate than the current parameters (step 112). If the quality metric is not improved by the new parameters $P_{ij}$, the general purpose computing device 28 reverts back to step 104 and continues to collect touch point data that satisfies the predetermined set of criteria.

At step 112, if the quality metric is improved, the projection matrix P is updated for each of the imaging devices 50A to 50D using the estimated new parameters $P_{ij}$ (step 114). The new quality metric is then stored, and any associated counters, temporary buffers, etc. are re-initialized (step 116). If further calibration of the interactive input system 20 is desired, the general purpose computing device 28 reverts back to step 104 and continues to collect touch point data that satisfies the predetermined set of criteria (step 104). If further calibration is not desired, the method ends.

Figure 4:
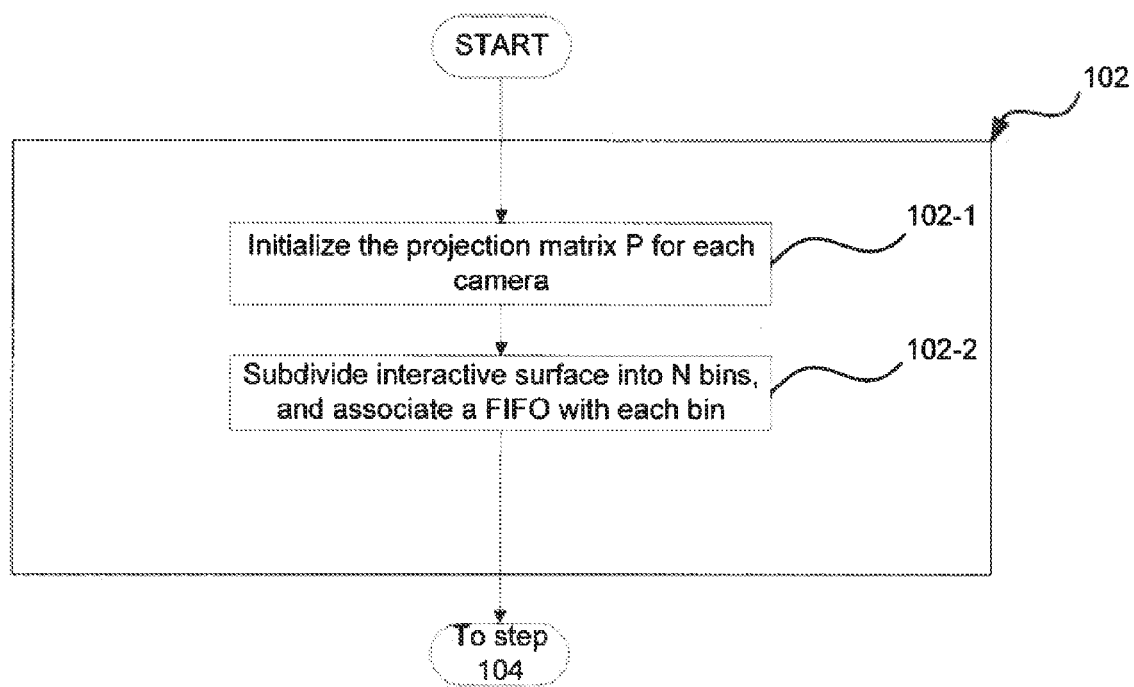
FIG. 4 is a flowchart showing further steps of the method of FIG. 3.

The steps performed during method 100 to calibrate interactive input system 20 will now be further described with reference to FIGS. 4 to 14. Turning now to FIG. 4, step 102 of method 100 is further illustrated. During step 102, a projection matrix P is obtained for each imaging device 50A to 50D (step 102-1). In this embodiment, the projection matrix P for each imaging device is obtained from a default model of the interactive input system 20 and its associated imaging devices 50A to 50D. Since the interactive input system 20 has four (4) imaging devices, the default model comprises four (4) conditions namely that: i) the focal points of the imaging devices are positioned at the corners of the interactive surface 24; ii) all imaging devices have optical axes equal to a multiple of 45 degrees; iii) all imaging device position and angle offsets are zero; and iv) the width W of the interactive surface 24 has a nominal value.

Figures 5, 6:
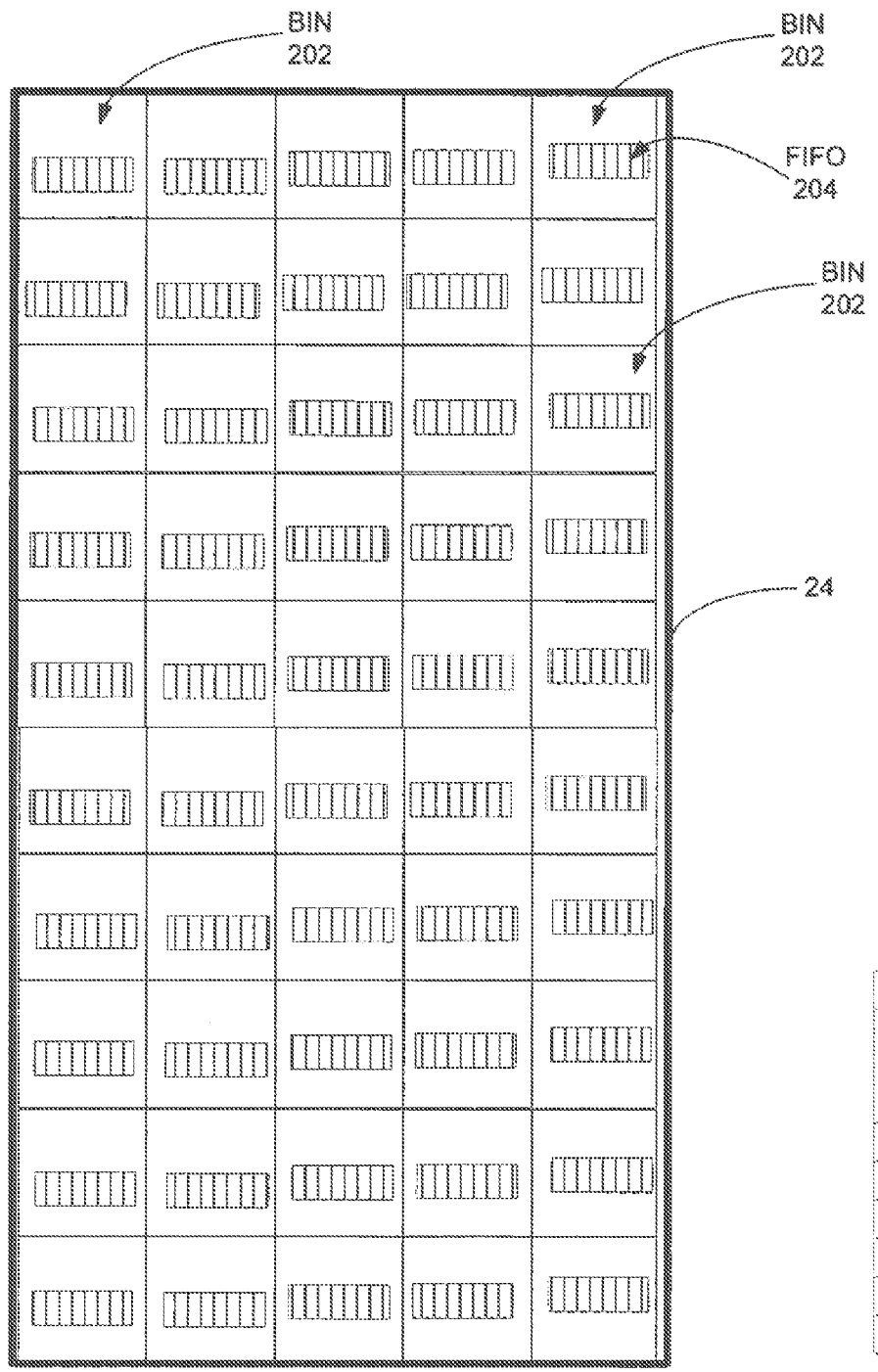
FIG. 5 is a diagram of the interactive input system subdivided into bins according to step 102 of FIG. 4.
FIG. 6 is a block diagram of a first-in-first-out (FIFO) buffer associated with a bin of FIG. 5.

Once the projection matrix P for each imaging device 50A to 50B has been obtained, different regions, areas, sections etc. of the interactive surface 24 are assigned to different bins 202 and a first-in-first-out (FIFO) buffer 204 is associated with each bin 202 (step 102-2) as shown in FIG. 5. In this embodiment, each bin 202 has the same shape and size. Each FIFO buffer 204, as shown in FIG. 6, comprises a stack of size N and stores touch point data corresponding to the most recent touch points made on the interactive surface 24 at locations of its respective bin 202. As will be appreciated, each FIFO buffer 204 is able to store touch point data for up to N touch points. In the event that the FIFO buffer 204 contains less than N touch points and a new touch point is to be added, the FIFO buffer 204 adds the new touch point to the stack. In the event that the FIFO buffer 204 contains N touch points and a new touch point is to be added to the stack, the first touch point stored in the FIFO buffer 204 is pushed out, and the new touch point is added to maintain a maximum number of N touch points in the FIFO buffer.

Figure 7:
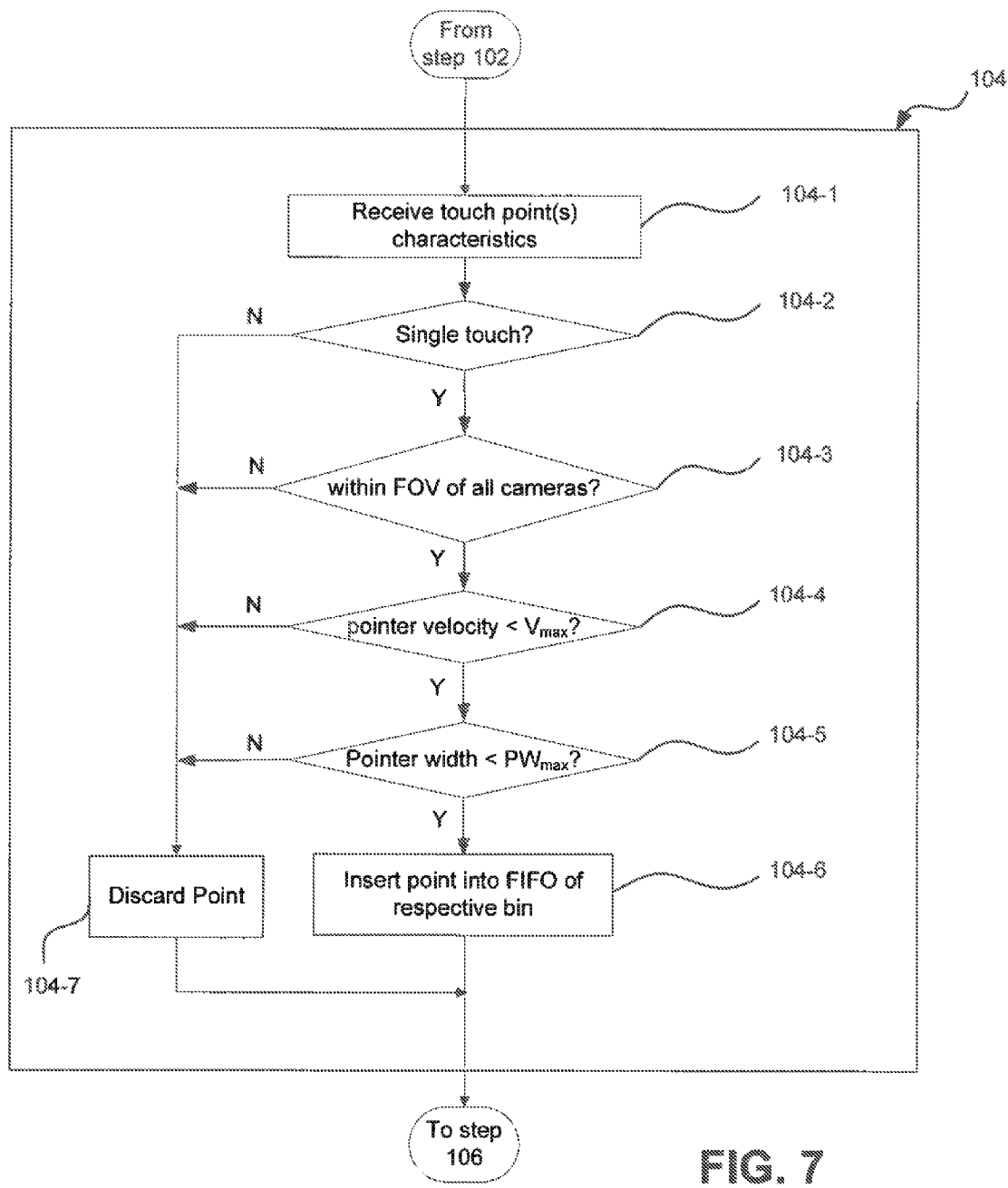
FIG. 7 is a flowchart showing further steps of the method of FIG. 3.

FIG. 7 further illustrates step 104 of method 100 wherein the interactive input system 20 collects touch point data associated with pointers brought into proximity with the interactive surface 24, and stores touch point data that satisfies a predetermined set of criteria. When one or more pointers are brought into proximity of the interactive surface 24, the imaging devices 50A to 50D generate pointer data that is conveyed to the general purpose computing device 28 (step 104-1). Upon receipt of the pointer data, the general purpose computing device 28 computes the location of each pointer appearing in captured image frames and a check is made to determine if touch point data was generated as a result of a single pointer touch (step 104-2). If the touch point data does not correspond to a single pointer touch, the touch point data is discarded (step 104-7) and method 100 proceeds to step 106. If the touch point data corresponds to a single pointer touch, a check is made by the general purpose computing device 28 to determine if the touch point data corresponds to a location within the fields of view (FOVs) of all four (4) imaging devices (step 104-3). If the touch point data does not correspond to a location within the FOVs of all four imaging devices 50A to 50D, the touch point data is discarded (step 104-7) and method 100 again proceeds to step 106.

If the touch point data corresponds to a location within the FOVs of all the imaging devices, a check is made by the general purpose computing device 28 to determine if the velocity of the pointer associated with the touch point data is less than a threshold maximum velocity $V_{max}$ (step 104-4). The velocity V of the pointer associated with the touch point data is calculated based on two successive touch points $(X_m, L_m)$ and $(X_{m-1}, Y_{m-1})$, according to:

$$V = \sqrt{(X_m - X_{m-1})^2 + (Y_m - Y_{m-1})^2} \qquad (13)$$

If the velocity V is greater than the threshold maximum velocity $V_{max}$, the touch point data is discarded (step 104-7) and the method 100 again proceeds to step 106. If the velocity V is less than or equal to the threshold maximum velocity $V_{max}$, a check is made by the general purpose computing device 28 to determine if the pointer width $P_W$ is less than a threshold pointer width $P_{Wmax}$. If the pointer width $P_W$ is greater than the threshold pointer width $P_{Wmax}$, it is assumed that the pointer is too close to one of the imaging devices and thus, is not suitable for the calibration process. The touch point data is then discarded (step 104-7) and the method 100 again proceeds to step 106. If the pointer width $P_W$ is less than or equal to the threshold pointer width $P_{Wmax}$, the touch point data is deemed to satisfy the set of predetermined criteria and is stored in the FIFO buffer 204 associated with the bin 202 that corresponds to the location of the touch point on the interactive surface 24 (step 104-6). The method 100 then proceeds to step 106.

Figure 8:
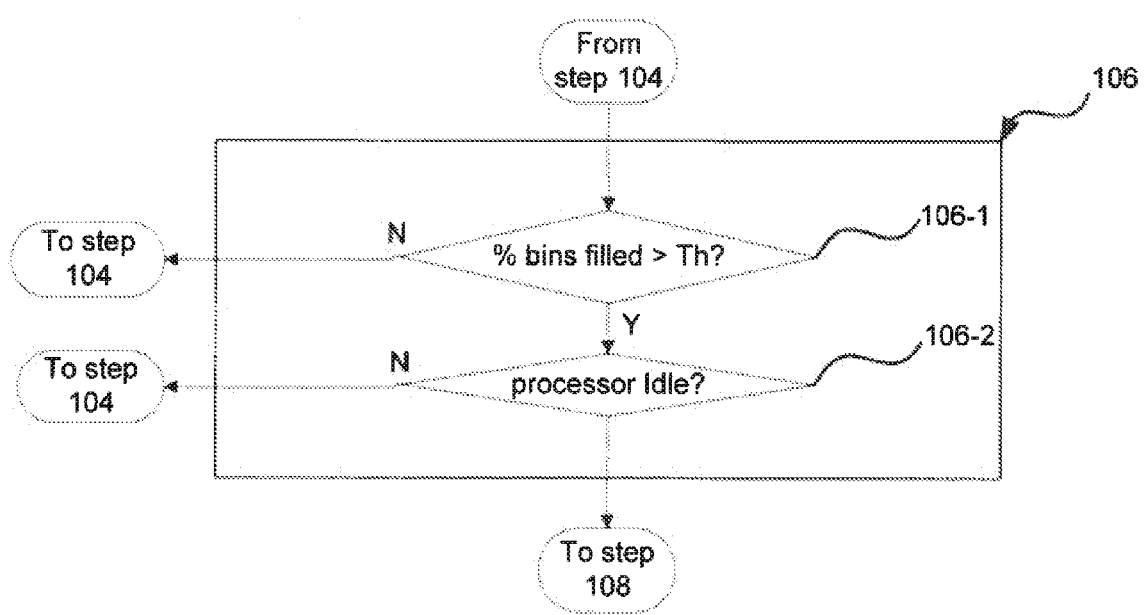
FIG. 8 is a flowchart showing further steps of the method of FIG. 3.

At step 106 of method 100, a check is performed by the general purpose computing device 28 to determine if the set of touch data stored in the FIFO buffers 204 satisfies one or more predefined conditions to initiate calibration of the interactive input system 20. FIG. 8 better illustrates steps performed during this check. As can be seen, in this embodiment, initially a check is performed to determine the percentage of bins 202 that have at least a predefined number of touch points, such as for example ten (10) touch points, stored in their respective FIFO buffers 204 signifying that the interactive input system 20 has collected enough touch point data generally over the entire interactive surface 24 to execute the calibration method (step 106-1). If the percentage of bins 202 having at least a predefined number of touch points stored in their respective FIFO buffers 204 is less than a predefined threshold percentage value, such as for example 90%, the method 100 returns to step 104 and general purpose computing device 28 continues to collect touch point data as described above. At step 106-1, if the percentage of bins 202 having at least a predefined number of touch point stored in their respective FIFO buffers 204 is greater than the predefined threshold percentage value, a check is made by the general purpose computing device 28 to determine if the processor of the general purpose computing device 28 has sufficient resources (e.g., memory, CPU cycles) to execute the calibration process (step 106-2). If the processor of the general purpose computing device 28 does not have sufficient resources to execute the calibration method, the method 100 again returns to step 104 and the general purpose computing device 28 continues to collect touch point data as described above. As will be appreciated, returning to step 104 to collect touch point data ensures that the most recent touch points are saved in the respective FIFO buffers 204.

At step 106-2, if the processor of the general purpose computer device 28 has sufficient memory to execute the calibration method, the general purpose computing device 28 proceeds to step 108 to estimate new parameters $P_{ij}$ for the projection matrix P associated with each of the imaging devices 50A to 50D (step 108).

Figure 9:
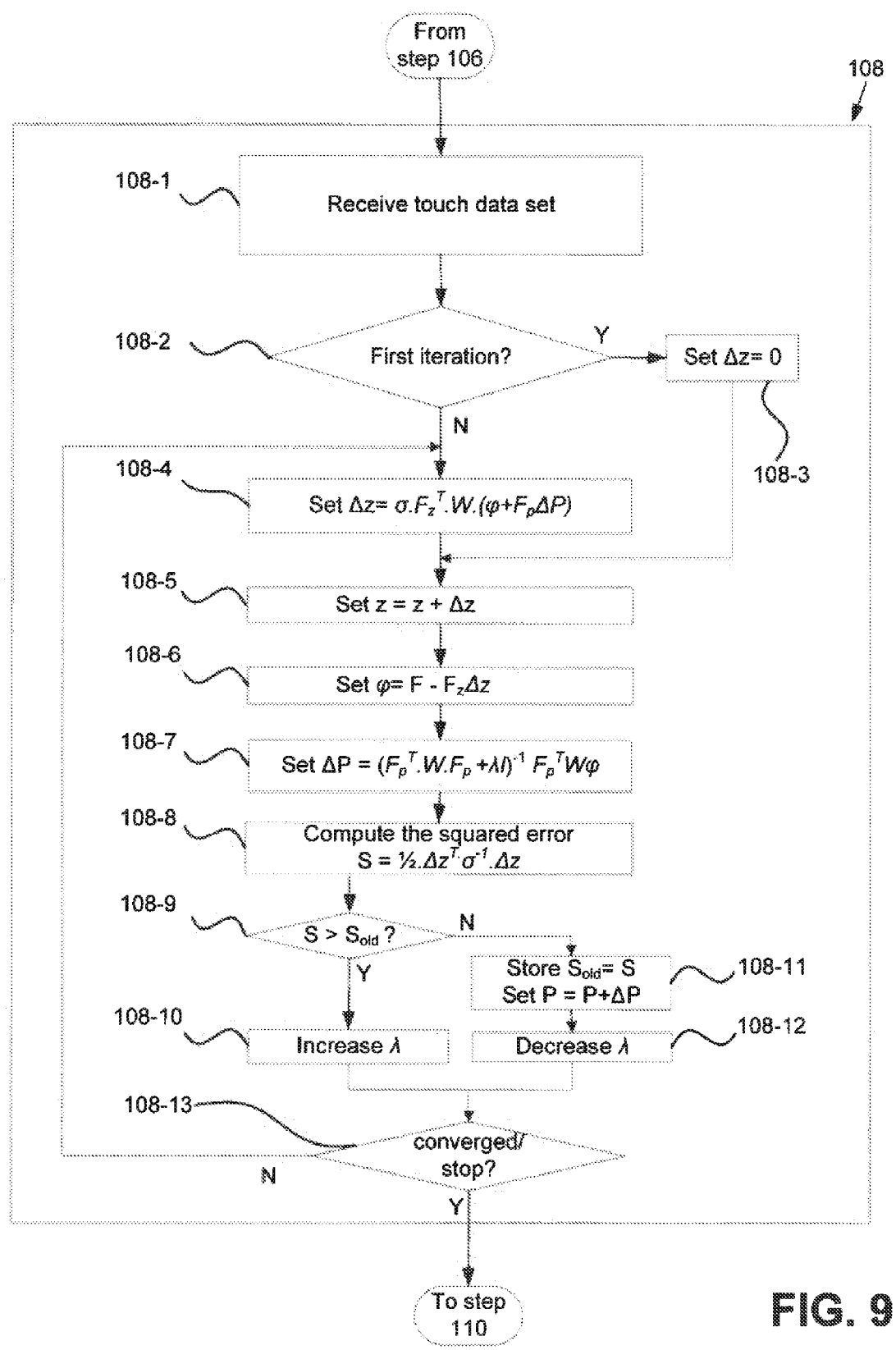
FIG. 9 is a flowchart showing further steps of the method of FIG. 3.
Figure 10:
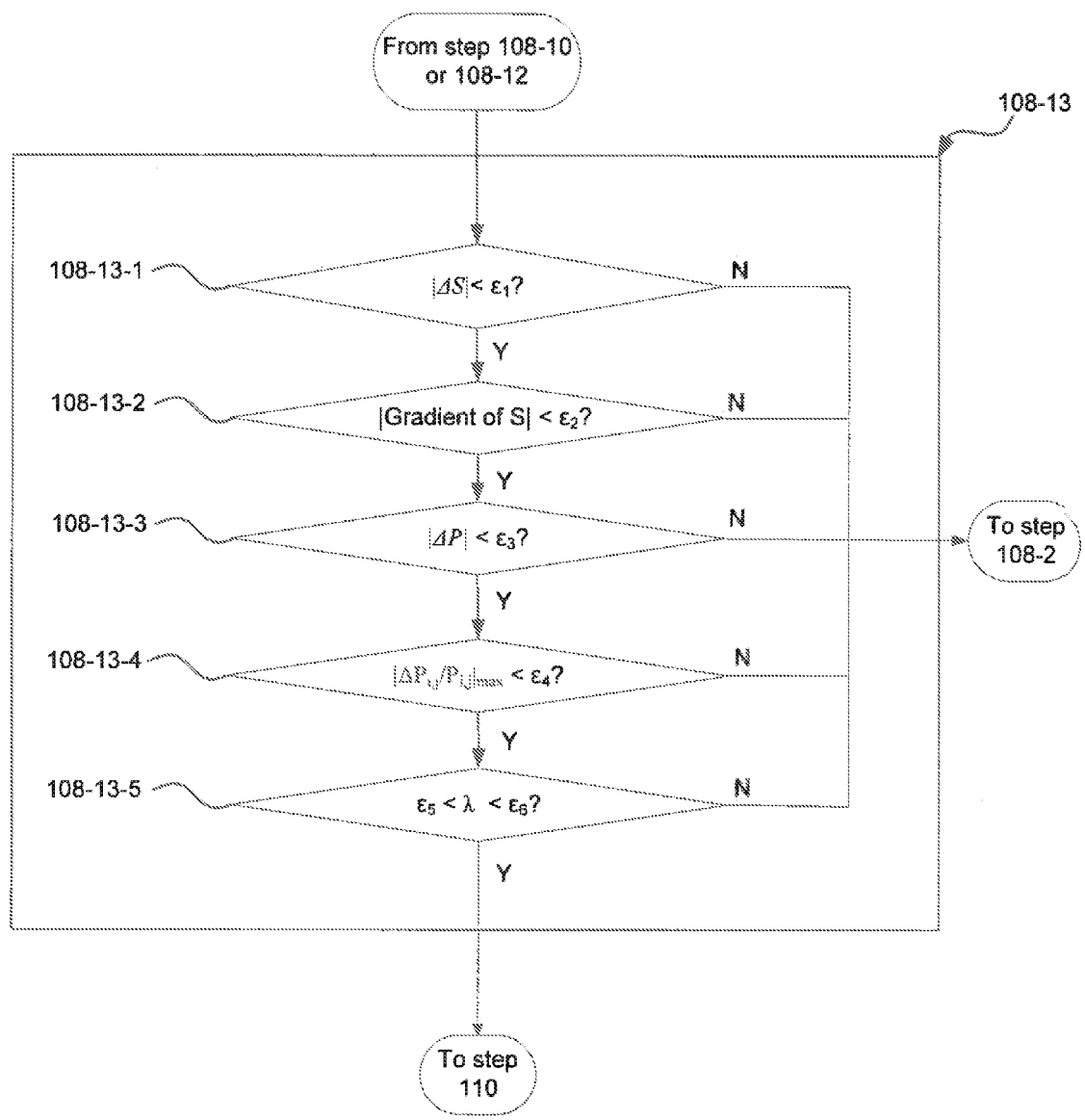
FIG. 10 is a flowchart showing further steps of the method of FIG. 3.

Turning now to FIG. 9, steps performed during estimation of the new parameters $P_{ij}$ for the projection matrix P associated with each imaging device are better illustrated. The following variables are used by the general purpose computing device 28 during step 108. An observation vector z resulting from n observation tuples in the form (x, X, Y) representing a touch point at coordinate (X, Y) and its column position x on the image sensor of a given imaging device, is defined as:

$$z = (z_1, z_2, \ldots, z_n)^T \equiv [x_1, X_1, Y_1, x_2, X_2, Y_2, \ldots, x_n, X_n, Y_n]^T$$

As is well known, superscript T represents transposition. The equations of condition F are defined as:

$$F(x, X, Y, P) = \begin{bmatrix} x_1 - \dfrac{P_{11}X_1 + P_{12}Y_1 + P_{13}}{P_{21}X_1 + P_{22}Y_1 + P_{23}} \\ x_2 - \dfrac{P_{11}X_2 + P_{12}Y_2 + P_{13}}{P_{21}X_2 + P_{22}Y_2 + P_{23}} \\ \vdots \\ x_n - \dfrac{P_{11}X_n + P_{12}Y_n + P_{13}}{P_{21}X_n + P_{22}Y_n + P_{23}} \end{bmatrix} = 0 \qquad (14)$$

Substituting z into Equation (14) results in:

$$F(z, P) = \begin{bmatrix} z_1 - \dfrac{P_{11}z_2 + P_{12}z_3 + P_{13}}{P_{21}z_2 + P_{22}z_3 + P_{23}} \\ z_4 - \dfrac{P_{11} \cdot z_5 + P_{12} \cdot z_6 + P_{13}}{P_{21} \cdot z_5 + P_{22} \cdot z_6 + P_{23}} \\ z_5 - \dfrac{P_{11}z_5 + P_{12}z_6 + P_{13}}{P_{21}z_5 + P_{22}z_6 + P_{23}} \\ \vdots \\ z_{3n-2} - \dfrac{P_{11}z_{3n-1} + P_{12}z_{3n} + P_{13}}{P_{21}z_{3n-1} + P_{22}z_{3n} + P_{23}} \end{bmatrix} = 0 \qquad (15)$$

A weight matrix W is defined as:

$$W = [F_z \cdot \sigma \cdot F_z^T]^{-1} \qquad (16)$$

where $F_z$ is the Jacobian Matrix of F with respect to z, and $\sigma$ is the data covariance matrix for observed data vector z.

Initially, the general purpose computing device 28 retrieves the set of touch data, that is, all touch point data saved in the FIFO buffers 204 (step 108-1). A check is then performed by the general purpose computing device 28 to determine if a prior iteration has been performed (step 108-2). If not signifying that this is the first iteration, a data adjustment value $\Delta z$ is set to zero (step 108-3) and an "old" squared error value $S_{old}$ is set to infinity. The method then proceeds to step 108-5.

At step 108-2, if a prior iteration has been performed, the data adjustment value $\Delta z$ is calculated according to:

$$\Delta z = \sigma \cdot F_z^T \cdot W \cdot (\phi + F_p \cdot \Delta P) \quad (17)$$

where $F_p$ is the Jacobian matrix of F with respect to P, $\phi$ is a residual vector, and $\Delta P$ is a parameter adjustment (step 108-4). The method then proceeds to step 108-5.

At step 108-5, the observation vector z is then calculated according to:

$$z = z + \Delta z \quad (18)$$

As will be appreciated, during the first iteration, $\Delta z = 0$ and thus, the observation vector z is the first observed value. The residual vector $\phi$ is the calculated according to:

$$\phi = F - F_z \cdot \Delta z \text{ (step 108-6)} \quad (19)$$

Next, the parameter adjustment $\Delta P$ is calculated according to:

$$\Delta P = (F_p^T \cdot W \cdot F_p + \mu I)^{-1} F_p^T W \phi \quad (20)$$

where $\lambda$ is the Levenberg-Marquardt accelerator parameter used in the Jefferys' method (step 108-7).

The squared error S is then calculated according to:

$$S = \frac{1}{2} \cdot \Delta z^T \cdot \sigma^{-1} \cdot \Delta z \text{ (step 108-8)} \quad (21)$$

The squared error S is compared to the old squared error value $S_{old}$ (step 108-9). If the squared error S is greater than the old squared value $S_{old}$ ($S > S_{old}$) then the Levenberg-Marquardt accelerator parameter $\lambda$ is increased by a predetermined factor, which in this embodiment is a factor of ten (10) (step 108-10). If the squared error S is less than or equal to the old squared error value $S_{old}$ ($S \leq S_{old}$) then the old squared value $S_{old}$ is set to the value of the squared error S, and the projection matrix P is set to its current value plus the parameter adjustment $\Delta P$ (P=P+$\Delta P$) (step 108-11). The Levenberg-Marquardt accelerator parameter $\lambda$ is decreased by the predetermined factor of ten (10) (step 108-12). As noted above, during the first iteration $S_{old} = \infty$ to ensure steps 108-11 and 108-12 are carried out during the first iteration.

Following either step 108-10 or step 108-12, a convergence test method is performed to determine if the estimation has converged (step 108-13). If the estimation has not converged, the process reverts back to step 108-4. If however, the estimation has converged, the method 100 proceeds to step 110.

The convergence test method begins by determining if $\Delta S$ is less than a predetermined tolerance $\epsilon_1$, which in this embodiment is set to a value of $10^{-8}$ (step 108-13-1). If $\Delta S$ is greater than or equal to tolerance $\epsilon_1$, it is determined that the estimation has not converged and the method returns to step 108-4 to perform the next iteration.

If $\Delta S$ is less than tolerance $\epsilon_1$, a check is performed by the general purpose computing device 28 to determine if the magnitude of the gradient of the sum of squares $|\nabla S|$ is less than a predetermined tolerance $\epsilon_2$, which in this embodiment is set to a value of $10^{-8}$ (step 108-13-2). If the magnitude of $|\nabla S|$ is greater than or equal to tolerance $\epsilon_2$, it is determined that the estimation has not converged and the method again returns to step 108-4 to perform the next iteration.

If the magnitude of $|\nabla S|$ is less than tolerance $\epsilon_2$, a check is performed by the general purpose computing device 28 to determine if the magnitude of the parameter adjustment $|\Delta P|$ is less than a predetermined tolerance $\epsilon_3$, which in this embodiment is set to a value of $10^{-8}$ (step 108-13-3). If the magnitude of the parameter adjustment $|\Delta P|$ is greater than or equal to tolerance $\epsilon_3$, it is determined that the estimation has not converged and the method again returns to step 108-4 to perform the next iteration.

If the magnitude of the parameter adjustment $|\Delta P|$ is less than tolerance $\epsilon_3$, a check is performed by the general purpose computing device 28 to determine if the maximum of the ratio of $|\Delta P_{i,j}/P_{i,j}|_{max}$ for each element $P_{i,j}$ of the projection matrix P is less than a predetermined tolerance $\epsilon_4$, which in this embodiment is set to a value of $10^{-8}$ (step 108-13-4). If the ratio $|\Delta P_{i,j}/P_{i,j}|_{max}$ is greater than or equal to tolerance $\epsilon_4$, it is determined that the estimation has not converged and the method again returns to step 108-4 to perform the next iteration.

If the ratio $|\Delta P_{i,j}/P_{i,j}|_{max}$ is less than tolerance $\epsilon_4$, a check is performed by the general purpose computing device 28 to determine if the Levenberg-Marquardt accelerator parameter $\lambda$ is greater than a predetermined tolerance $\epsilon_5$, which in this embodiment is set to a value of $10^{-16}$ and less than a predetermined tolerance $\epsilon_6$, which in this embodiment is set to a value of $10^6$. If the acceleration parameter $\lambda$ is less than or equal to tolerance $\epsilon_5$ or if acceleration parameter $\lambda$ is greater than or equal to tolerance $\epsilon_6$, it is determined that the estimation has not converged and the method again returns to step 108-4 to perform the next iteration. If the acceleration parameter $\lambda$ is greater than to tolerance $\epsilon_5$ and less than tolerance $\epsilon_6$, the estimation is deemed to have converged and thus, new estimates for the parameters of each projection matrix P are obtained.

Figure 11:
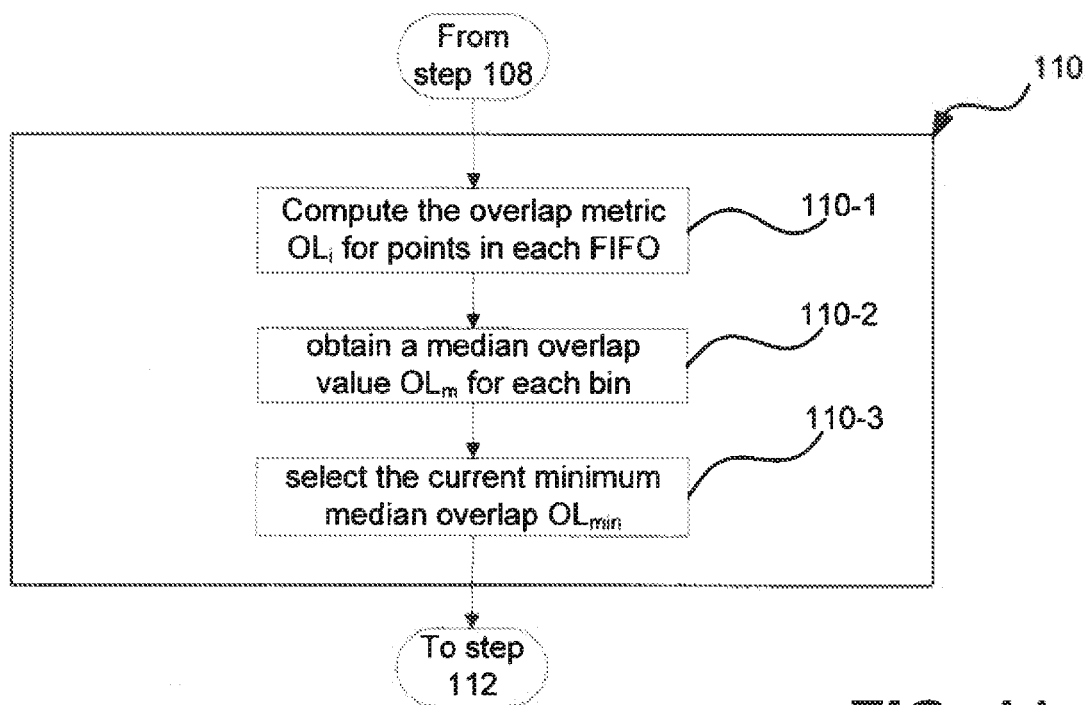
FIG. 11 is a flowchart showing further steps of the method of FIG. 3.

As mentioned previously, at step 110 a quality metric for the new elements of each projection matrix P is calculated. Turning now to FIG. 11, steps performed during the quality metric calculation are better illustrated. In this embodiment, an overlap metric (OL) is used as the quality metric to accept or reject the new parameters of each projection matrix P. Initially, the overlap metric $OL_i$ is calculated for all touch points saved in the FIFO buffers 204 (step 110-1).

Figure 12A:
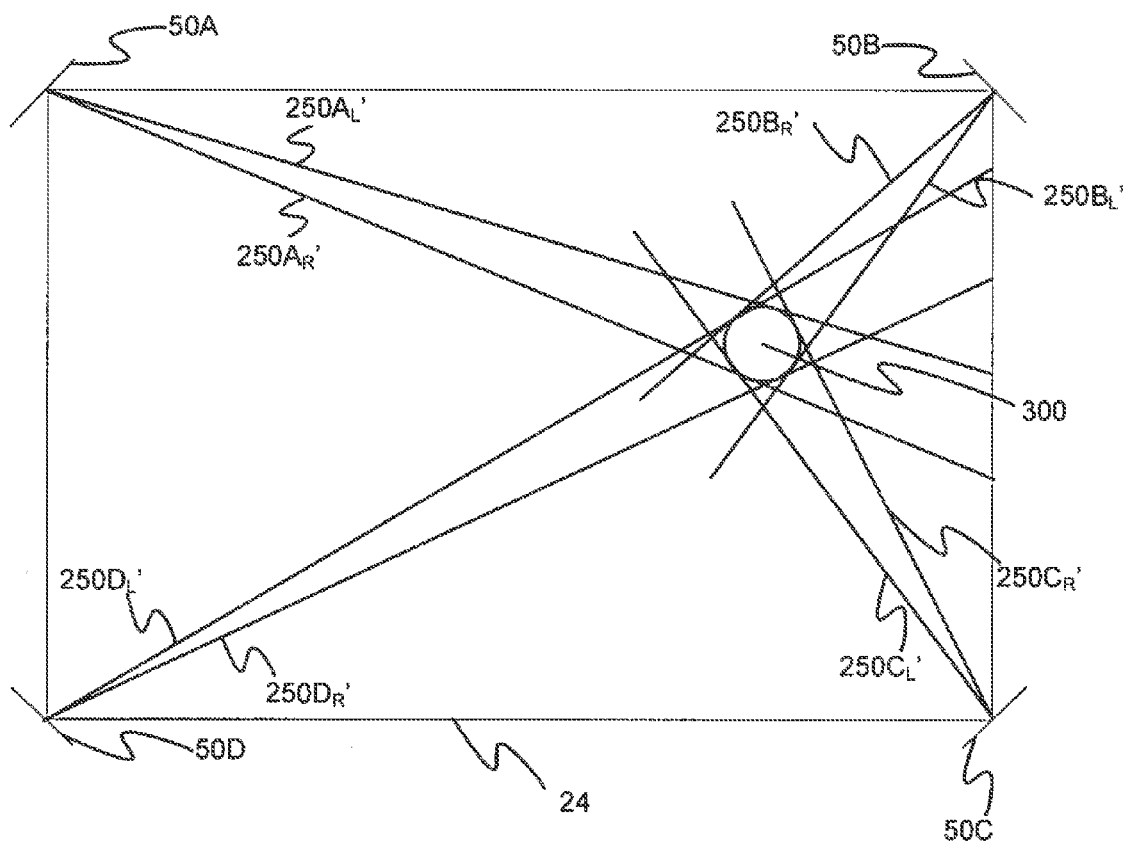
FIG. 12A is a diagram showing ideal lines of sight of imaging devices forming part of the interactive input system of FIG. 1.

Turning to FIG. 12A, a pointer 300 brought into contact with the interactive surface 24 is shown, where the interactive input system 20 is considered to be ideally calibrated. As can be seen, pointer 300 is positioned within the field of view of each of the imaging devices 50A to 50D. Imaging device 50A identifies right and left boundaries (detected as column positions on the associated image sensor) of pointer 300 as illustrated by ideal lines of sight 250A$_L$' and 250A$_R$'. Imaging devices 50B, 50C, and 50D also identify left and right boundaries of the pointer 300 as illustrated by ideal lines of sight 250B$_L$' and 250B$_R$', 350C$_L$' and 250C$_R$', and 250D$_L$' and 250D$_R$', respectively.

Figure 12B:
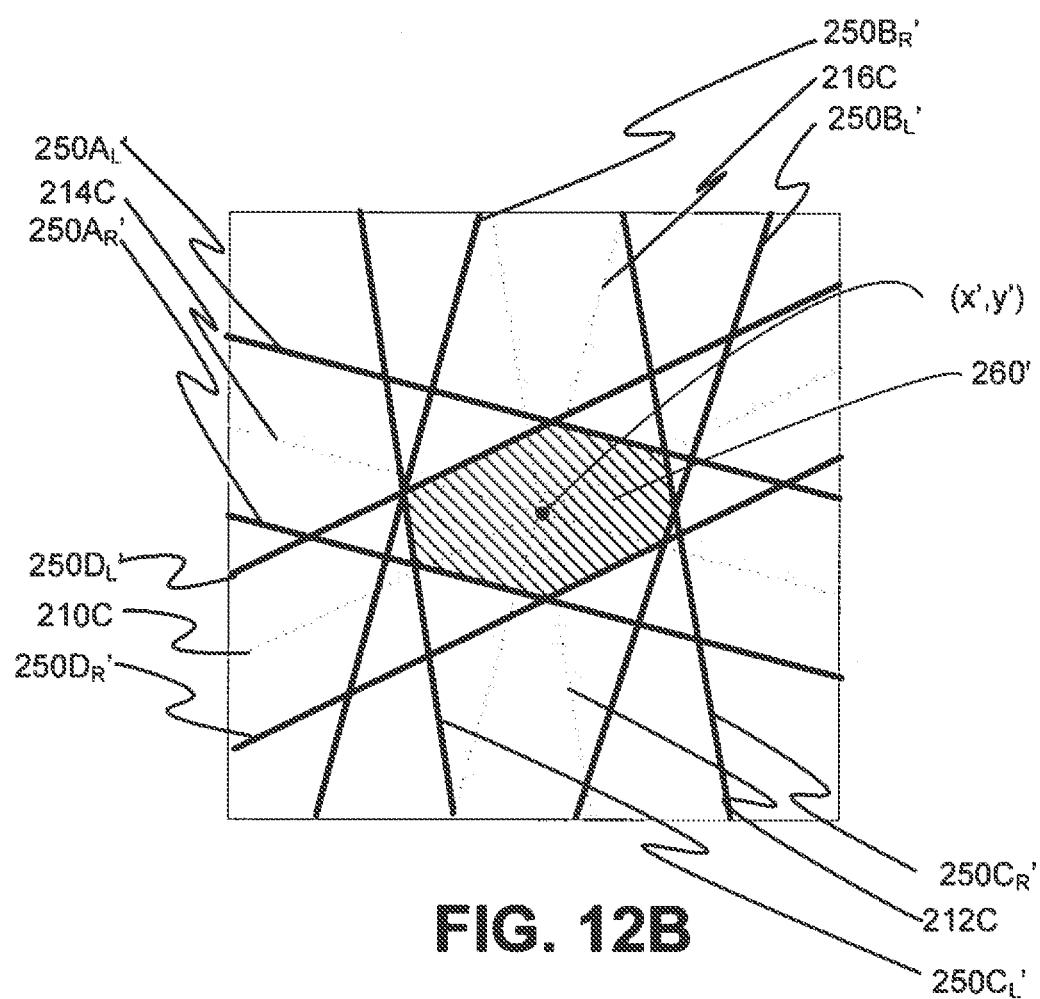
FIG. 12B shows an ideal polygon formed by the ideal lines of sight of FIG. 12A.

As can be seen in FIG. 12B, a polygon 260' having a boundary formed by the intersection of the ideal lines of sight 250A$_L$', 250A$_R$', 250B$_L$', 250B$_R$', 250C$_L$', 250C$_R$', 250D$_L$' and 250D$_R$' is defined. The centroid of polygon 260' has coordinates (x', y'). The area ($A_{max}$) of polygon 260' is calculated using the centroid coordinates (x', y') and the width of the pointer 300 is determined by the intersecting lines of sight. As will be appreciated, since the interactive input system 20 is ideally calibrated, the area of polygon 260' corresponds to the maximum theoretical area for a detected pointer having the same width.

Figure 13A:
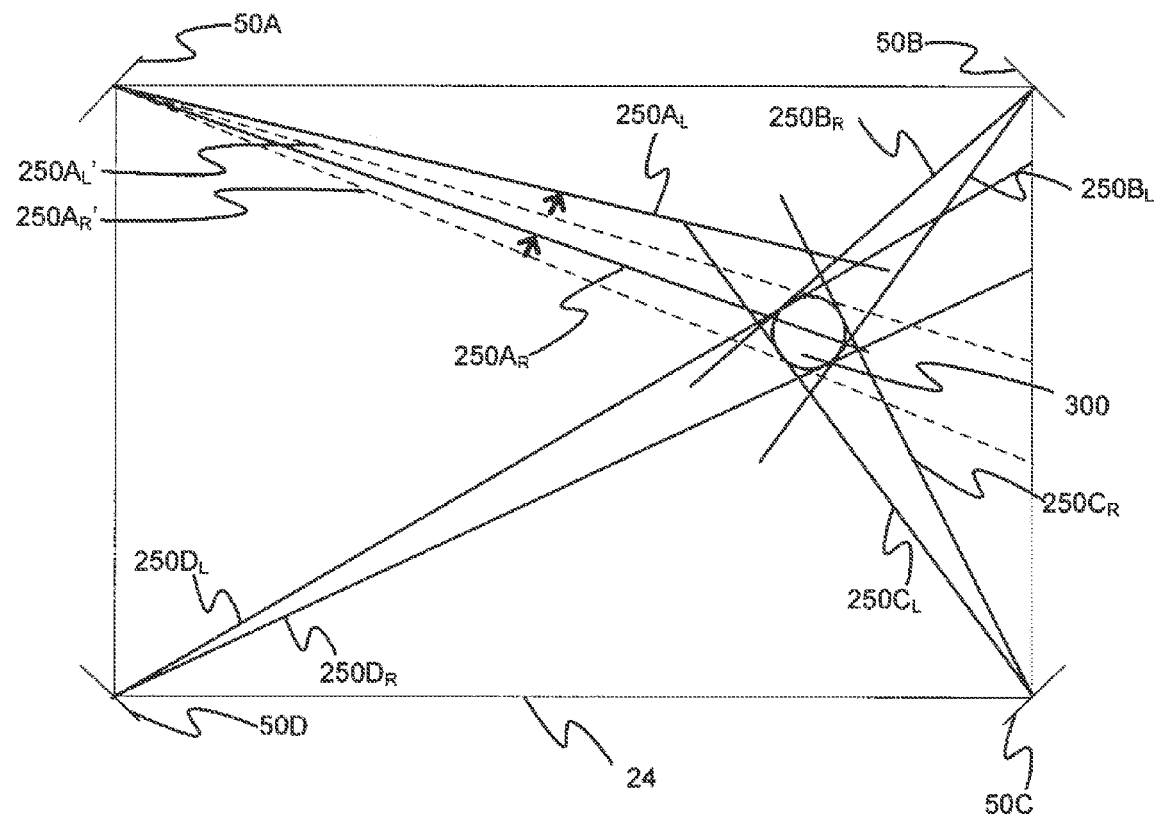
FIG. 13A shows observed lines of sight of the imaging devices.

In the event that the interactive input system 20 is out of calibration, the lines of sight identified by the imaging devices may not correspond to the actual left and right boundaries of pointer 300. For example, as shown in FIG. 13A, imaging device 50A identifies right and left boundaries of pointer 300 as illustrated by observed lines of sight 250A$_L$ and 250A$_R$. Imaging devices 50B, 50C and 50D also identify left and right boundaries of the pointer 300 as illustrated by observed lines of sight $250B_L$ and $250B_R$, $250C_L$ and $250C_R$, and $250D_L$ and $250D_R$, respectively. Comparing the observed lines of sight shown in FIG. 13A with the ideal lines of sight shown in FIG. 12A, it can be seen that imaging devices 50B, 50C and 50D are properly calibrated. However, imaging device 50A identifies left and right boundaries of pointer 300 incorrectly as observed lines of sight $250A_L$ and $250A_R$. For comparison, the ideal lines of sight $250A_L'$ and $250A_R'$ (from FIG. 12A) are also shown. As will be appreciated, this signifies that imaging device 50A is out of calibration and the parameters of the associated imaging device projection matrix P are not well determined.

Figure 13B:
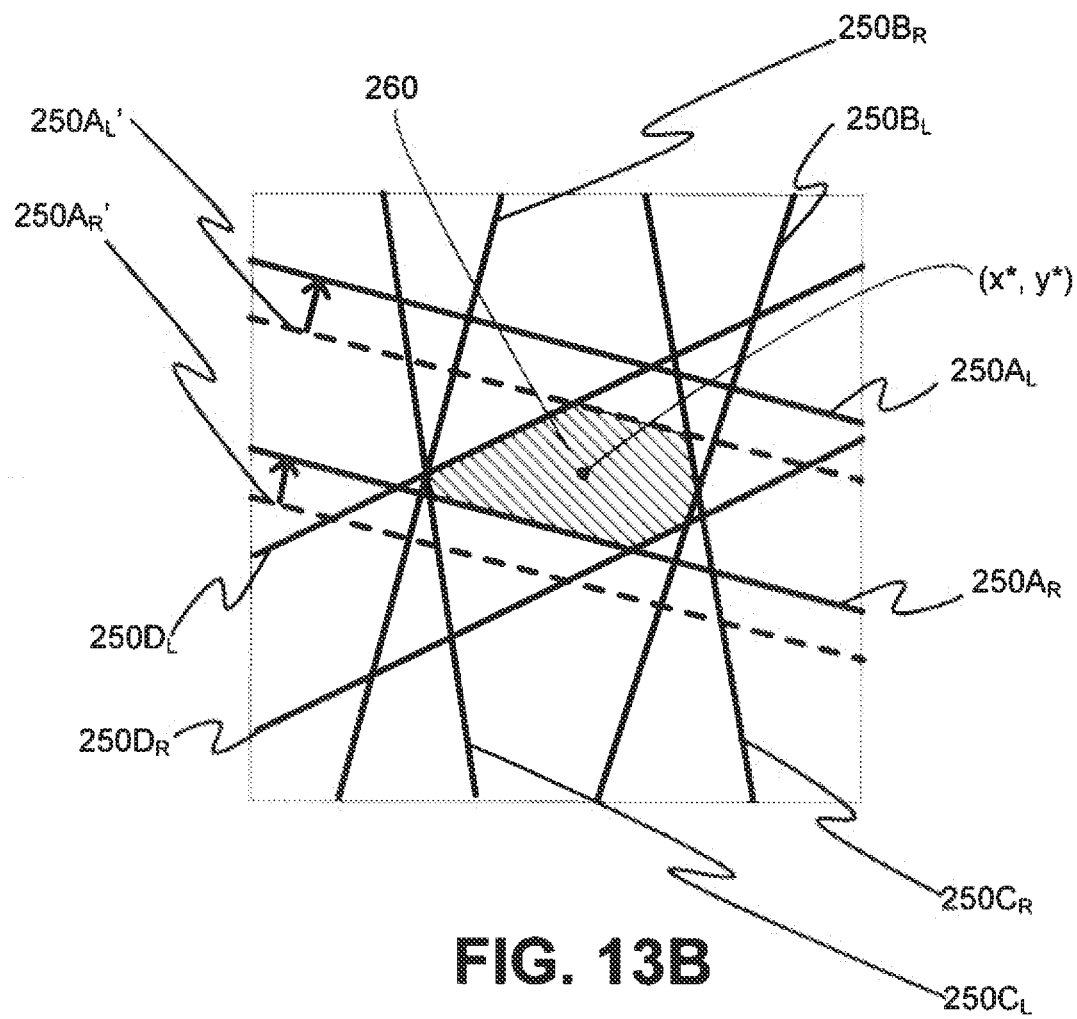
FIG. 13B shows an observed polygon formed by the observed lines of sight of FIG. 13A.

As can be seen in FIG. 13B, a polygon 260 is formed representing the intersection of the observed lines of sight $250A_L$, $250A_R$, $250B_L$, $250B_R$, $250C_L$, $250C_R$, $250D_L$ and $250D_R$. The centroid of polygon 260 has coordinates (x*, y*). The area ($A_{obs}$) of polygon 260 is calculated using the centroid coordinates (x*, y*) and the width of the pointer 300 is determined by the intersecting observed lines of sight. As will be appreciated, since the interactive input system 20 is out of calibration, the area of polygon 260 will be less than the maximum theoretical area ($A_{max}$) calculated for polygon 260'.

As noted above, the overlap metric $OL_i$ is used as the quality metric to accept or reject the new parameters of each projection matrix P. The overlap metric is calculated according to:

$$OL = \frac{A_{obs}}{A_{max}} \quad (22)$$

where $A_{obs}$ is the observed area of the polygon formed from the intersection of the observed lines of sight of the imaging devices, and $A_{max}$ is the maximum theoretical area of the polygon formed from the intersection of the ideal lines of sight of the imaging devices.

In this embodiment, maximum theoretical area $A_{max}$ is calculated by using the observed width of pointer 300 from the observed lines of sight and back-projecting the centroid (x*,y*) of polygon 260 to each imaging device's respective focal plane to compute a set of theoretical pointer edges. The computed centroid (x*,y*) shown in FIG. 13B is treated as if it were the center of a theoretical polygon, that is, the observed centroid coordinates (x*,y*) are considered to be equal to the theoretical centroid coordinates (x',y') shown in FIG. 12B, and is back-projected along lines 210C, 212C, 214C, and 216C into the respective focal plane of each imaging device. Using the width of pointer 300, theoretical pointer edges are computed for each respective focal plane from the back-projected location of the centroid. The theoretical edges are then used to identify intersections, vertices, and a theoretical area $A_{max}$ for the corresponding theoretical polygon.

Since the maximum possible value of the observed area $A_{obs}$ is equal to the maximum theoretical area $A_{max}$, it will be appreciated that the limits of the overlap metric $OL_i$ are:

$$0 \leq OL_i \leq 1 \quad (23)$$

The greater the errors or bias in the parameters of the projection matrix P, the lower the value of the overlap metric $OL_i$, and the lower the value of the overlap metric $OL_i$, the more out of calibration the interactive input system 20 is.

Returning now to FIG. 11, the overlap metric $OL_i$ is calculated for all touch points saved in the FIFO buffers 204 (step 110-1). The median overlap metric $OL_m$ is calculated for each bin 202 by taking the median value of all calculated values of the overlap metric $OL_i$ associated with its FIFO buffer 204 (step 110-2). All median overlap metrics $OL_m$ are then compared, and the minimum median overlap metric is selected as the new minimum median overlap metric $OL_{min}$ (step 110-3). The quality metric of the new estimate is selected as the new minimum median overlap metric $OL_{min}$. The method 100 then continues to step 112.

If the new quality metric ($OL_{min}$) is greater than the previously stored quality metric, it is assumed that the new parameters of projection matrix P are more accurate than the current parameters, and thus the quality metric is improved (step 112). If the new quality metric ($OL_{min}$) is less than the previously stored quality metric, it is assumed that the new parameters of projection matrix P are less accurate than the current parameters, and the method returns to step 104.

Figure 14:
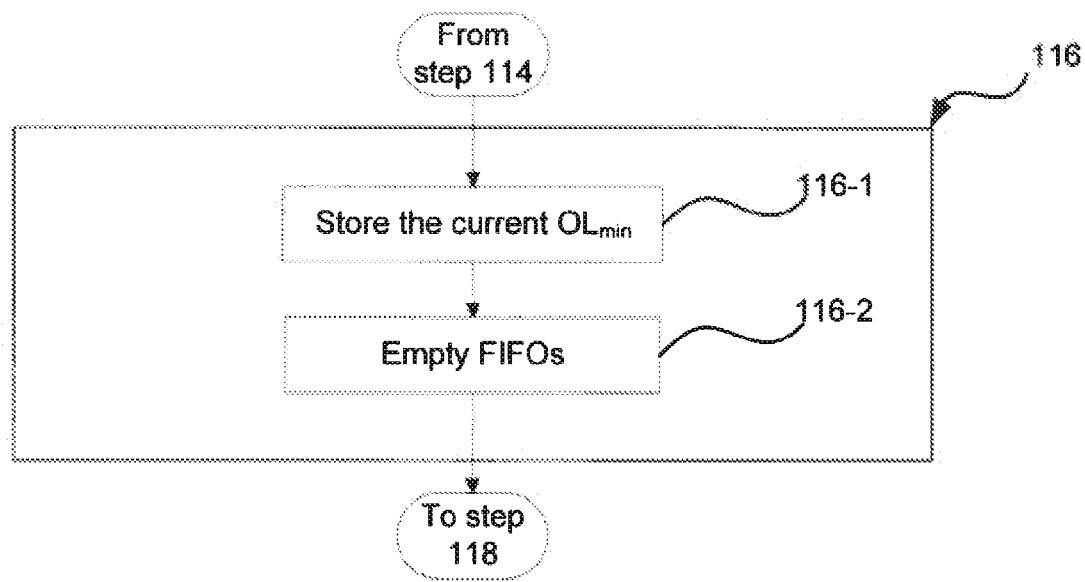
FIG. 14 is a flowchart showing further steps of the method of FIG. 3.

At step 112, if the quality metric is improved by the new parameters, the projection matrix P is updated for each of the imaging devices using the new estimate (step 114). As noted above, once the projection matrix P is updated, the new quality metric is then stored, and any associated counters, temporary buffers, etc. are re-initialized (step 116). FIG. 14 better illustrates the process carried out at step 116. As can be seen, the new quality metric $OL_{min}$ is stored as the current quality metric (step 116-1) and all FIFO buffers 204 are emptied (step 116-2). If further calibration is desired, the general purpose computing device 28 continues to collect touch data (step 104), and method 100 continues as described above. If further calibration is not desired, the method ends.

In another embodiment, the quality metric is calculated using a concurrency based auto-calibration (CBA) approach. In this embodiment, the calibration of parameters $P_{ij}$ for the projection matrix P associated with each of the imaging devices 50A to 50D is performed by determining how close each of the direct lines of sight of each of the imaging devices 50A to 50D is to the location of a pointer brought into proximity with the interactive surface 24. As will be appreciated, should all imaging devices 50A to 50D be properly (or ideally) calibrated, the direct lines of sight of each of the imaging devices 50A to 50D will intersect with one another at the location of the pointer.

Figure 15:
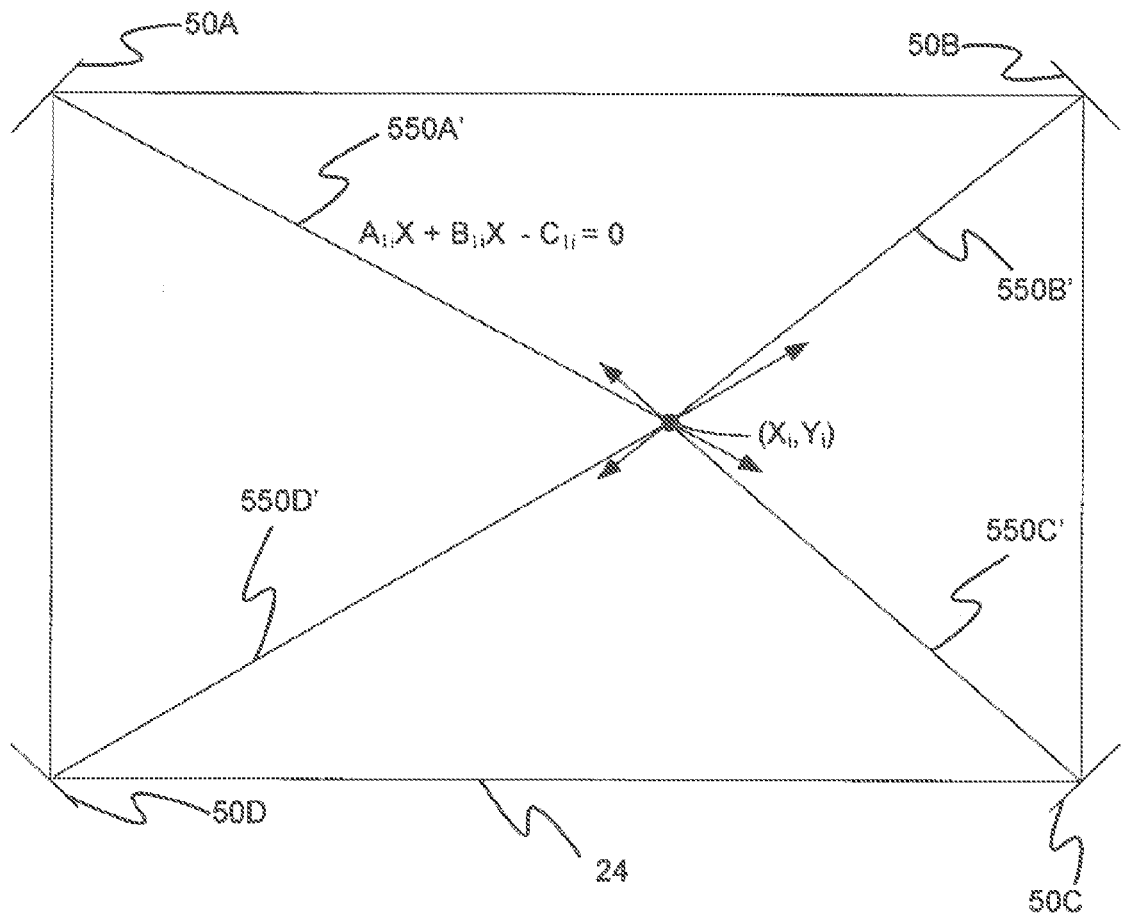
FIG. 15 is a diagram showing ideal direct lines of sight of the imaging devices according to another embodiment.

Turning now to FIG. 15, the ideal direct lines of sight of each of the imaging devices 50A to 50D are shown in the event a pointer is brought into proximity with the interactive surface 24. As can be seen, the pointer is located at coordinates ($X_i'$, $Y_i'$) on the interactive surface 24. Imaging device 50A has an ideal direct line of sight 550A'. Similarly, imaging devices 50B, 50C, 50D have ideal direct lines of sight 450B', 450C', 450D', respectively. The intersection of the ideal direct lines of sight corresponds to the exact location of the pointer on the interactive surface 24, that is, at coordinates ($X_i'$, $Y_i'$).

Comparing FIG. 15 to FIG. 12A, it will be appreciated that a direct line of sight (shown in FIG. 15) differs from a line of sight (shown in FIG. 12A), in that the direct line of sight is the direct line from the imaging device to the approximate center of the pointer, while a line of sight identifies one of the left and right boundaries of the pointer.

Figure 16:
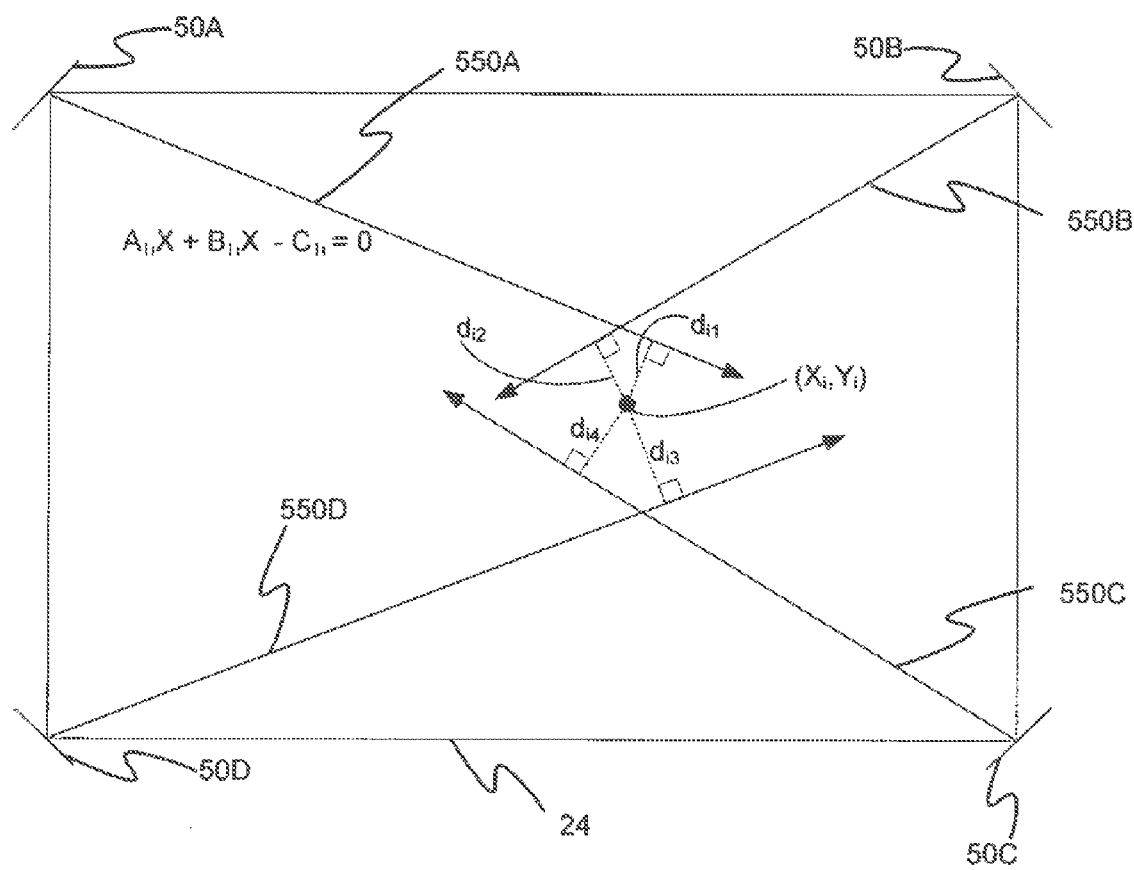
FIG. 16 is a diagram showing the observed direct lines of sight of the imaging devices according to yet another embodiment.

Turning now to FIG. 16, the observed direct lines of sight of each of the imaging devices 50A to 50D are shown in the event a pointer is brought into proximity with the interactive surface 24. The pointer is located at coordinates ($X_i$, $Y_i$) on the interactive surface 24. Imaging device 50A has an observed direct line of sight 550A. Similarly, imaging devices 50B, 50C, 50D have observed direct lines of sight 550B, 550C, and 550D, respectively. As can be seen, and in comparison to FIG. 15, the observed direct lines of sight do not intersect at a single point that corresponds to the exact location ($X_i$, $Y_i$) of the pointer on the interactive surface 24, indicating that the interactive input system 20 is not properly calibrated and thus, the parameters of the associated imaging device projection matrix P are not well determined.

The orthogonal distance $d_i$ from the direct observed direct line of sight of each imaging device to the location of the pointer $(X_i, Y_i)$ on the interactive surface 24 is also shown. As can be seen, the orthogonal distance for imaging device 50A is identified as distance $d_{i1}$. Similarly, the orthogonal distances for imaging devices 50B, 50C and 50D are respectively identified as $d_{i2}$, $d_{i3}$, and $d_{i4}$. The greater the distances $d_{i1}$, $d_{i2}$, $d_{i3}$, and $d_{i4}$ are, the less accurate the parameters in the projection matrix P for the respective imaging device are.

The observed direct lines of sight 550A, 550B, 550C, and 550D are defined by the angular position of the pointer with respect to the center of projection of each imaging device. It is noted that the reference Cartesian coordinate system defined above with reference to FIG. 2 is also used in this embodiment.

The coordinates of the $k^{th}$ imaging device are defined as $(X_{Ck}, Y_{Ck})$, the orientation angle of the $k^{th}$ imaging device is denoted as $\theta_k$, and the focal length of the $k^{th}$ imaging device is denoted as $f_k$.

The total number of imaging devices in the interactive input system is denoted as integer Q, where:

$$1 \leq k \leq Q \tag{24}$$

The location of a pointer brought into contact with the interactive surface 24, also referred to as "target location", is defined as $(X_i, Y_i)$, where:

$$1 \leq i \leq T \tag{25}$$

and where T is the number of target locations, also referred to as "targets".

Thus, for T targets, Q imaging devices and M parameters to be estimated for each imaging device, the number of degrees of freedom (DOF) is:

$$\text{DOF} = QM + 2T \tag{26}$$

and the number of constraints NC is:

$$NC = TQ \tag{27}$$

It is well known that a solution to finding a value for the unknown variables is unique up to a similarity transformation, such as described in the publication authored by Astrom, Kalle and Oskarsson, Magnus, and entitled "Solutions and Ambiguities of the Structure and Motion Problem for 1D Retinal Vision," *Journal of Mathematical Imaging and Vision*, vol. 12, (1999): 121-135, the disclosure of which is incorporated by reference in its entirety.

As shown in FIG. 2, since imaging device 50A is positioned at origin (0, 0) and imaging device 50D is positioned at (0, 1), the number of DOF is reduced by four (4). As such, Equation (26) can be rewritten as:

$$\text{DOF} = QM + 2T - 4 \tag{28}$$

As will be appreciated, a solution exists to the optimization if:

$$NC \geq \text{DOF} \tag{29}$$

In this embodiment, the number of imaging devices Q is equal to four (Q=4) and the number of parameters M to be estimated for each imaging device is equal to four (M=4). Substituting the values for Q and M into Equation (28) yields:

$$\text{DOF} = 16 + 2T - 4 = 12 + 2T \tag{30}$$

Substituting Equation (30) into Equation (29) yields:

$$NC \geq 12 + 2T \tag{31}$$

Substituting Equation (27) into Equation (31) yields:

$$TQ \geq 12 + 2T \tag{32}$$

and since Q=4:

$$4T \geq 12 + 2T \tag{33}$$

Thus:

$$T > 6 \tag{34}$$

As shown in Equation (34), the number of pointers T required is greater than or equal to six (6) to yield a least squares problem.

The cost function to be minimized in this embodiment (i.e., using CBA approach) will now be described below. The cost function $\theta_C$ may be written as Equation (35) according to:

$$f_C = \sum_{i=1}^{T} \sum_{k=1}^{Q} d_{ik}^2 \tag{35}$$

where $d_{ik}$ is the orthogonal distance from the observed direct line of sight of the $k^{th}$ imaging device to the location of the pointer $(X_i, Y_i)$ on the interactive surface 24, as described above.

The observed direct line of sight for the $k^{th}$ imaging device is given by the equation:

$$A_{ki}X + B_{ki}Y - C_{ki} = 0 \tag{36}$$

The coefficients $A_{ki}$, $B_{ki}$, and $C_{ki}$ of the observed direct line of sight for the $k^{th}$ imaging device are related to the internal imaging device parameters as:

$$A_{ki} = \tan(\tan^{-1}(f_k \tan(\alpha_i)) + \theta_k) \tag{37}$$

$$B_{ki} = 1; \text{ and} \tag{38}$$

$$C_{ki} = A_{ki}X_{Ck} - Y_{Ck} \tag{39}$$

where:

$$\alpha_i = \tan^{-1}(x_{ik}/f_k); \tag{40}$$

$x_{ik}$ is column position on the image sensor of the $k^{th}$ imaging device resulting from a pointer at position $(X_i, Y_i)$, on the interactive surface 24 and $f_k$ is the $k^{th}$ imaging device's effective focal length, measured in pixels.

The orthogonal distance $d_{ik}$ of the observed direct line of sight of the $k^{th}$ imaging device to the location of the pointer $((X_i, Y_i)$ on the interactive surface 24 is calculated as:

$$d_{ik} = \frac{A_{ki}X_i + B_{ki}Y_i - C_{ki}}{\sqrt{A_{ki}^2 + B_{ki}^2}} \tag{41}$$

As will be appreciated, in the ideal case shown in FIG. 15, where the observed direct lines of sight of each imaging device all intersect at a single location, the cost function $f_C$ is at a minimum, that is, $f_C = 0$.

In this embodiment, a minimizer $\hat{z}$ for the cost function $f_C(z)$ is a set of parameters $\hat{z} = \{X_{Ck}, Y_{Ck}, \theta_k, f_k, X_i, Y_i\}$ that minimizes the cost function $f_C$. A variety of numerical methods can be applied to this nonlinear least squares estimation problem. In this embodiment, the nonlinear function optimizer Broyden-Fletcher-Goldfarb-Shanno (BFGS) method, or alternately its limited memory version (LM-BFGS), is applied sequentially to the subsets of the parameter space iteratively, until convergence is achieved or a failure to converge is detected.

The BFGS method is well known and is described in the publication authored by William H. Press, Saul A. Teukolsky, William T. Vetterling, Brian P. Flannery, entitled "Numerical Recipes 3$^{rd}$ Ed.: The Art of Scientific Computing," William H. Press et al., (New York: Cambridge University Press) p. 521, the disclosure of which is incorporated herein by reference in its entirety. In this embodiment, the BFGS method is applied using the mathematical software package MATLAB™, which has a built in function fminunc( ) used to solve nonlinear optimization problems. As will be appreciated, other types of mathematical software packages may be used such as for example Mathematica™, Maple™, IDL™ etc.

Figure 17:
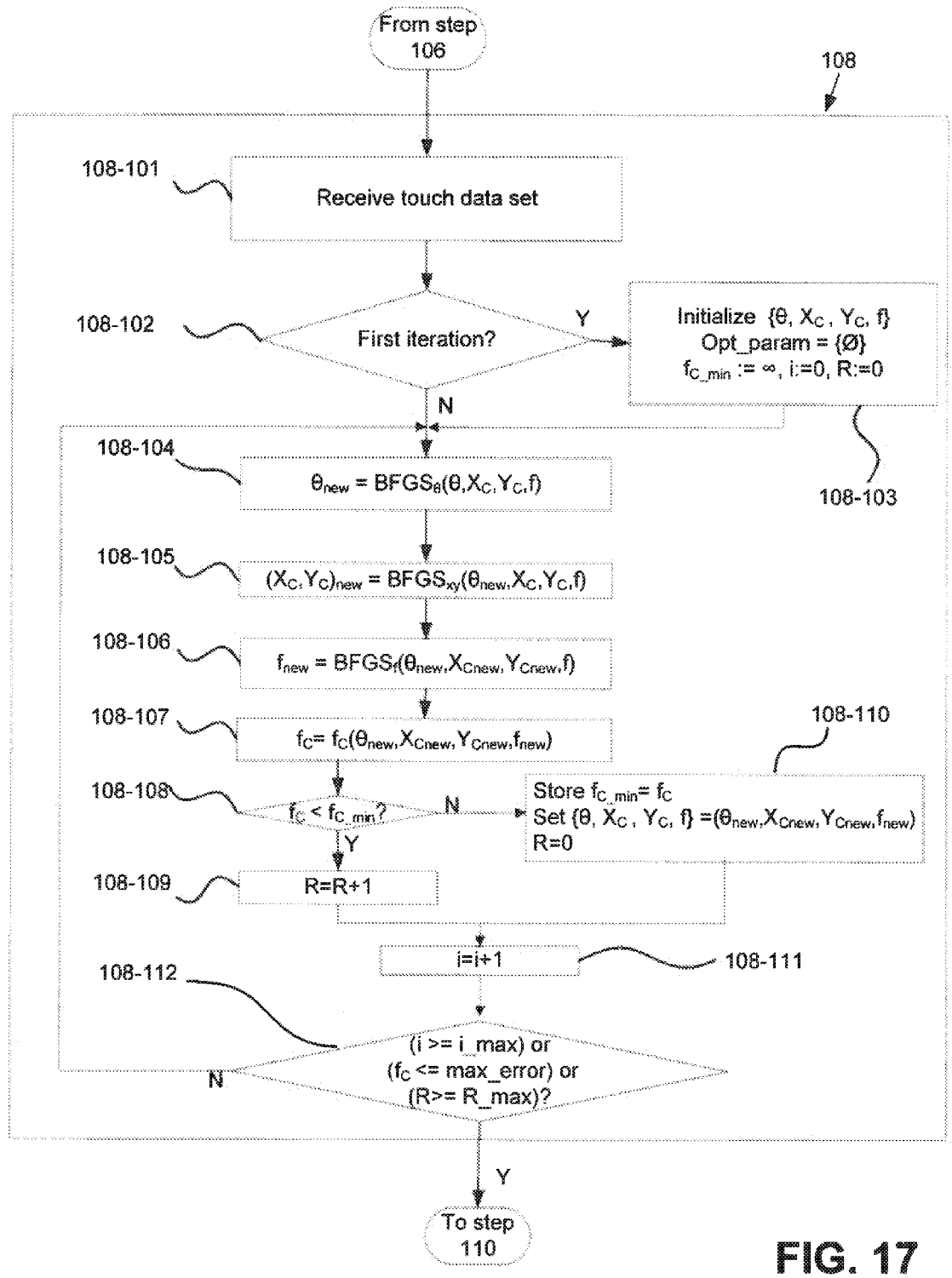
FIG. 17 is a flowchart showing specifics of step 108 of FIG. 3 according to another embodiment.

Turning now to FIG. 17, the process of step 108 used in this embodiment is shown. The general purpose computing device 28 receives the touch data set, that is, all touch data saved in the FIFO buffers 204 (step 108-101). During the first iteration (step 108-102), storage variables and arrays for the optimization parameters ($\theta$, $X_C$, $Y_C$, f), loop counters, and current parameter values are initialized (step 108-103). As will be appreciated, for imaging device 50A the coordinates are known and thus in this embodiment the optimization parameters ($X_C$, $Y_C$) are set to a constant value of (0, 0). Similarly, for imaging device 50D the coordinates are known and thus in this embodiment the optimization parameters ($X_C$, $Y_C$) are set to a constant value of (0, 1).

The BFGS optimizer is applied sequentially to the subsets of the parameter space iteratively, beginning with a new estimate of the orientation angle $\theta_{new}$ (step 108-104), which is then followed by a new estimate for the location of the imaging device ($X_{Cnew}$, $Y_{Cnew}$) (step 108-105), and a new estimate for the focal length $f_{new}$ (step 108-106).

The cost function $f_C$ is then calculated using Equation (35) described above (step 108-107) and compared to the current minimum value $f_{C\_min}$ achieved so far (step 108-108). As will be appreciated, during the first iteration (step 108-103) $f_{C\_min}=\infty$.

If the new value of the cost function is not less than the current minimum value $f_{C\_min}$ (step 108-109), residual counter R is incremented by one (1) (step 108-109) and the method continues to step 108-111 to increment the loop count. If the new value of the cost function $f_C$ is less than the current minimum value $f_{C\_min}$ (step 108-109), then current minimum value $f_{C\_min}$ is set to the new cost function value $f_C$, that is $f_{C\_min}=f_C$ and the new parameters $\theta_{new}$, $X_{Cnew}$, $Y_{Cnew}$, and $f_{new}$ are stored as the current optimum parameters (step 108-110). The residual counter R is set to zero (0).

The new estimates $\theta_{new}$, $X_{Cnew}$, $Y_{Cnew}$, and $f_{new}$ are then stored as $\theta$, $X_C$, $Y_C$, and f, respectively (step 108-110). A loop counter i is incremented (step 108-111).

It is then determined if any of the conditions for stopping the iteration have been met (step 108-112). In this embodiment, the conditions for stopping the iteration are: if the loop counter i is greater than or equal to a predefined counter threshold i_max (i≥i_max); if the cost function value $f_C$ is less than or equal to a predefined maximum error threshold max_error ($f_C$≤max_error); or if the residual counter R is greater than or equal to a predefined maximum threshold R_max (R≥R_max). If none of the conditions for stopping the iteration have been met, then the method returns to step (108-104) to estimate new parameters. If any or all of the conditions for stopping the iteration have been met the method continues to step 110 as described above with reference to FIG. 3.

Although it is described above that the optimization parameters ($X_C$, $Y_C$) of imaging devices 50A and 50D are set to a constant value of (0, 0) and (0, 1), respectively, during step 108-103, those skilled in the art will appreciate that these values may be also be estimated during each iteration. In this embodiment, all optimization parameters ($\theta$, $X_C$, $Y_C$, f) for each imaging device are estimated until method 100 converges. Once method 100 converges, a transformation is applied that maps the estimated parameters ($X_C$, $Y_C$) for imaging devices 50A and 50D to the known values of (0, 0) and (0, 1), respectively. In this embodiment, the transformation mapping is carried out by matrix multiplication using transformation matrix:

$$\begin{bmatrix} X'_C \\ Y'_C \\ 1 \end{bmatrix} = \begin{bmatrix} s\cdot\cos(\theta_t) & -s\cdot\sin(\theta_t) & t_x \\ s\cdot\sin(\theta_t) & s\cdot\cos(\theta_t) & t_y \end{bmatrix} \begin{bmatrix} X_C \\ Y_C \\ 1 \end{bmatrix} \quad (42)$$

wherein ($X'_C$, $Y'_C$) are the known locations (0,0) or (0,1), and the transformation matrix allows for scaling by a factor s, rotation by angle $\theta_t$ and translation by ($t_x$, $t_y$) to the known location.

As will be appreciated, interactive input systems having large interactive surfaces and utilizing a greater number of imaging devices such as for example Q=6, Q=8, Q=12 may be calibrated according to any of the above-described embodiments.

As will be appreciated, touch data includes the coordinates of a pointer brought into contact with the interactive surface. Any type of pointer may be used such as for example a user's finger or hand, a passive pen tool, an active pen tool, an interactive pen used in conjunction with an interactive projector, etc.

Although embodiments are described above in which the FIFO buffers are uniformly sized and all bins are uniformly dimensioned, those skilled in the art will appreciate that the FIFO buffers and bins need not be non-uniformly sized and dimensioned.

Although embodiments of step 106 of method 100 described above perform a check to determine the percentage of bins that have at least a predefined number of touch points, those skilled in the art that other criteria may be used to determine if conditions for calibration have been met. For example, the conditions for calibration may be based on statistical criteria such as for example an average number or median number of stored touch points in the FIFO buffer associated with each bin. In another embodiment, the percentage of bins that have full FIFO buffers is compared to a predefined full FIFO buffer threshold. In another embodiment, the percentage of bins that do not have empty FIFO buffers is compared to a predefined not empty FIFO buffer threshold. In another embodiment, the criteria used to determine if conditions for calibration have been met is whether a user has manually selected to perform the calibration such as for example by pressing a button. In still yet another embodiment, the number of stored touch points in each of the FIFO buffers is summed and compared to a minimum number of total stored touch points threshold. If the total number of stored touch points is greater than the threshold, the condition for calibration is met.

Although the embodiment described above with reference to FIG. 17 is described as using a numerical BFGS method, those skilled in the art will appreciate that other types of numerical methods may be used such as for example the Levenberg-Marquardt method described above.

Although various tests are described above to determine if the iterative analysis has resulted in convergence, those skilled in the art will appreciate that only one is required to determine if the iterative analysis has converged. Further, additional tests may be carried out to determine if the iterative analysis has converged.

In the embodiments described above, although the interactive device is described as being in an upright orientation, those of skill in the art will appreciate that the interactive device may take other orientations and forms. For example, the interactive device may be in a horizontal orientation and form part of a touch table.

It will be appreciated, that although embodiments have been described herein with reference to the drawings, modifications and variations may be made without departing from the scope thereof as defined by the appended claims.

What is claimed is:

1. A method for generally continuously calibrating an interactive input system, the interactive input system comprising at least two imaging devices having fields of view encompassing a region of interest, at least one of said imaging devices calibrated using a projection matrix having an associated quality metric, the method comprising:
   storing a plurality of computed locations generated in response to each pointer brought into said region of interest;
   when said plurality of computed locations satisfy at least one condition, estimating new values for parameters of the projection matrix based on a plurality of computed locations of at least one pointer brought into proximity with the region of interest;
   calculating a new quality metric using the new parameter values; and
   if the new quality metric is more accurate than the existing quality metric, updating the projection matrix using the new parameter values.

2. The method of claim 1 wherein the at least one condition is satisfied when the number of stored computed locations is greater than a threshold.

3. The method of claim 1 wherein the at least one condition is satisfied when a threshold number of computed locations generally over the entire region of interest have been stored.

4. The method of claim 3 wherein the region of interest is subdivided into a plurality of bins, during said storing each computed location being stored in a respective bin, said at least one condition being satisfied when the total number of bins having at least a threshold number of computed locations therein is greater than the threshold.

5. The method of claim 3 wherein the region of interest is subdivided into a plurality of bins, during said storing each computed location being stored in a respective bin, said at least one condition being satisfied when the percentage of non-empty bins is greater than the threshold.

6. The method of claim 1 wherein the at least one condition is satisfied in response to user instruction to perform calibration.

7. The method of claim 1 wherein the region of interest is subdivided into a plurality of bins, during said storing each computed location being stored in a respective bin, said at least one condition being based on statistical criteria of the computed locations stored in at least one of the bins.

8. The method of claim 7 wherein the statistical criteria comprises an average number of bins having at least a threshold number of computed locations stored therein.

9. The method of claim 7 wherein the statistical criteria comprises a median number of bins having at least a threshold number of computed locations stored therein.

10. The method of claim 1 wherein the quality metric is an overlap metric.

11. The method of claim 10 further comprising determining an area of a polygon formed by the intersection of observed lines of sight of the at least one pointer as identified by each of the at least two imaging devices, and determining a ratio of the area to a maximum theoretical area to calculate the overlap metric.

12. The method of claim 11 wherein said maximum theoretical area is determined by:
   determining a width of the at least one pointer using the observed lines of sight;
   calculating a centroid of an area formed by the intersection of the observed lines of sight of the at least one pointer;
   back-projecting the centroid to a respective focal plane associated with each of the at least two imaging devices;
   calculating theoretical edges of the at least one pointer using the width of the at least one pointer; and
   calculating the theoretical area of a polygon formed by the theoretical edges.

13. The method of claim 1 wherein the quality metric is a concurrency-based metric.

14. The method of claim 13 further comprising determining a direct line of sight of each of the at least two imaging devices to the at least one pointer and calculating an orthogonal distance from each of the direct lines of sight of each of the at least two imaging devices to a computed location of the at least one pointer and computing a cost function based on the orthogonal distances to calculate the overlap metric.

15. The method of claim 14, wherein the cost function comprises summing the orthogonal distances to calculate the overlap metric.

16. The method of claim 14 wherein said updating reduces the cost function.

17. The method of claim 1 wherein each computed location is stored only if said computed location satisfies at least one qualification criteria.

18. The method of claim 17 wherein said at least one qualification criteria requires said computed location to correspond to a single pointer brought into proximity with said region of interest.

19. The method of claim 17 wherein said at least one qualification criteria requires the computed location to be within the fields of view of the at least two imaging devices.

20. The method of claim 17 wherein said at least one qualification criteria requires a width of the at least one pointer associated with said computed location to be below a width threshold.

21. The method of claim 17 wherein said at least one qualification criteria requires a velocity of the at least one pointer associated with said computed location to be below a velocity threshold.

22. A method of calibrating an interactive input system comprising:
   during normal operation of said interactive input system, storing a plurality of computed locations generated in response to pointer interaction with an interactive surface; and
   when the computed locations satisfy at least one condition, calibrating the interactive input system using the computed locations,
   wherein the interactive surface is subdivided into a plurality of bins, during said storing said computed locations being stored in respective bins.

23. The method of claim 22 wherein the at least one condition is satisfied when the number of stored computed locations is greater than a threshold.

24. The method of claim 22 wherein the at least one condition is satisfied when a threshold number of computed locations generally over the entire interactive surface have been stored.

25. The method of claim 24 wherein said at least one condition is satisfied when the total number of bins having at least a threshold number of computed locations therein is greater than the threshold.

26. The method of claim 24 wherein said at least one condition is satisfied when the percentage of non-empty bins is greater than the threshold.

27. The method of claim 22 wherein the at least one condition is satisfied in response to user instruction to perform calibration.

28. The method of claim 22 wherein said at least one condition is based on statistical criteria of the computed locations stored in at least one of the bins.

29. The method of claim 28 wherein the statistical criteria comprises an average number of bins having at least a threshold number of computed locations stored therein.

30. The method of claim 29 wherein the statistical criteria comprises a median number of bins having at least a threshold number of computed locations stored therein.

31. The method of claim 22 wherein each computed location is stored only when the computed location satisfies at least one qualification criteria.

32. The method of claim 31 wherein said at least one qualification criteria requires said computed location to correspond to a single pointer brought into proximity with said interactive surface.

33. The method of claim 31 wherein said at least one qualification criteria requires a width of the at least one pointer associated with said computed location to be below a width threshold.

34. The method of claim 31 wherein said at least one qualification criteria requires a velocity of the at least one pointer associated with said computed location to be below a velocity threshold.

35. A non-transitory computer readable medium embodying a computer program for execution by a computing device to perform the method according to claim 1.

36. An interactive input system comprising:
at least two imaging devices configured to capture images of a region of interest from different vantages, at least one of the imaging devices calibrated using a projection matrix having a quality metric; and
processing structure configured to process captured images to compute locations of pointers brought into proximity of said region of interest and to calibrate the interactive input system according to the method of claim 1.

37. An interactive input system comprising:
an interactive board configured to generate output in response to pointer interaction therewith; and
a processor device communicating with the interactive board, said processor device, during operation of said interactive input system, storing a plurality of computed locations generated in response to pointer interaction with said interactive board, and when the computed locations satisfy at least one condition, calibrating the interactive input system using the computed locations, wherein the interactive board is subdivided into a plurality of bins and said processor device is configured to store the computed locations in respective bins.

38. The interactive input system of claim 37 wherein the at least one condition is satisfied when the number of stored computed locations is greater than a threshold.

39. The interactive input system of claim 37 wherein the at least one condition is satisfied when a threshold number of computed locations generally over the entire interactive board have been stored.

40. The interactive input system of claim 39 wherein said at least one condition is satisfied when the total number of bins having at least a threshold number of computed locations therein is greater than the threshold.

41. The interactive input system of claim 39 wherein said at least one condition is satisfied when the percentage of non-empty bins is greater than the threshold.

42. The interactive input system of claim 37 wherein the at least one condition is satisfied in response to user instruction to perform calibration.

43. The interactive input system of claim 37 wherein said at least one condition is based on statistical criteria of the computed locations stored in at least one of the bins.

44. The interactive input system of claim 43 wherein the statistical criteria comprises an average number of bins having at least a threshold number of computed locations stored therein.

45. The interactive input system of claim 43 wherein the statistical criteria comprises a median number of bins having at least a threshold number of computed locations stored therein.

46. The interactive input system of claim 37 wherein each computed location is stored only when the computed location satisfies at least one qualification criteria.

47. The interactive input system of claim 46 wherein said at least one qualification criteria requires said computed location to correspond to a single pointer brought into proximity with said interactive board.

48. The interactive input system of claim 46 wherein said at least one qualification criteria requires a width of the at least one pointer associated with said computed location to be below a width threshold.

49. The interactive input system of claim 46 wherein said at least one qualification criteria requires a velocity of the at least one pointer associated with said computed location to be below a velocity threshold.

* * * * *